(12) United States Patent
Eryurek et al.

(10) Patent No.: US 7,515,977 B2
(45) Date of Patent: Apr. 7, 2009

(54) INTEGRATED CONFIGURATION SYSTEM FOR USE IN A PROCESS PLANT

(75) Inventors: Evren Eryurek, Edina, MN (US);
Terrance F. Krouth, Eden Prairie, MN (US); Jane E. Lansing, Minneapolis, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 674 days.

(21) Appl. No.: 10/812,752

(22) Filed: Mar. 30, 2004

(65) Prior Publication Data

US 2005/0222698 A1  Oct. 6, 2005

(51) Int. Cl.
*G05B 15/00* (2006.01)
*G06F 17/00* (2006.01)

(52) U.S. Cl. .......................................... 700/83; 700/90
(58) Field of Classification Search ................. 700/83, 700/17
See application file for complete search history.

(56) References Cited

U.S. PATENT DOCUMENTS

| | | | |
|---|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,827,423 A | 5/1989 | Beasley et al. |
| 4,885,694 A | 12/1989 | Pray et al. |

(Continued)

OTHER PUBLICATIONS

Case-based help desk system with diagrammatic interface Kitamura, M.; Nakatani, Y.; Systems, Man, and Cybernetics, 1998. 1998 IEEE International Conference on vol. 2, Oct. 11-14, 1998 pp. 1272-1277 vol. 2 Digital Object Identifier 10.1109/ICSMC.1998.728057.*

(Continued)

*Primary Examiner*—Michael B. Holmes
(74) *Attorney, Agent, or Firm*—Marshall, Gerstein & Borun LLP

(57) ABSTRACT

An integrated configuration viewing system for use in a process plant includes a computer readable memory and a plurality of template configuration objects stored on the computer readable memory. Each of the plurality of template configuration objects includes a graphical representation of a physical entity within the process plant, a parameter storage adapted to communicate with the process plant to obtain and store device parameter information associated with the physical entity within the process plant, and a configuration storage adapted to store configuration parameters associated with the physical entity within the process plant. A first routine is stored on the computer readable memory and adapted to be executed on the processor to present a library section on a user interface. The library section is adapted to present depictions of the plurality of template configuration objects to a user via the user interface. A second routine is stored on the computer readable memory and adapted to be executed on the processor to present a configuration area on the user interface. And a third routine is stored on the computer readable memory and adapted to be executed on the processor to enable a user to select one of the plurality of template configuration objects from the library section and to place the selected template configuration object within the configuration area to create a process configuration module within the configuration area.

161 Claims, 10 Drawing Sheets

U.S. PATENT DOCUMENTS

| | | | |
|---|---|---|---|
| 4,907,167 A | 3/1990 | Skeirik | |
| 4,910,691 A | 3/1990 | Skeirik | |
| 4,944,035 A | 7/1990 | Aagardl et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,594,858 A | 1/1997 | Blevins | |
| 5,596,704 A | 1/1997 | Geddes et al. | |
| 5,640,491 A | 6/1997 | Bhat et al. | |
| 5,666,297 A | 9/1997 | Britt et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,768,119 A | 6/1998 | Havekost et al. | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,809,490 A | 9/1998 | Guiver et al. | |
| 5,812,394 A | 9/1998 | Lewis et al. | |
| 5,818,736 A * | 10/1998 | Leibold | 703/16 |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,838,563 A | 11/1998 | Dove et al. | |
| 5,842,189 A | 11/1998 | Keeler et al. | |
| 5,847,952 A | 12/1998 | Samad | |
| 5,859,773 A | 1/1999 | Keeler et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,917,840 A | 6/1999 | Cheney et al. | |
| 5,918,233 A | 6/1999 | La Chance et al. | |
| 5,924,086 A | 7/1999 | Mathur et al. | |
| 5,940,290 A | 8/1999 | Dixon | |
| 5,940,294 A | 8/1999 | Dove | |
| 5,948,101 A | 9/1999 | David et al. | |
| 5,949,417 A | 9/1999 | Calder | |
| 5,960,214 A | 9/1999 | Sharpe, Jr. et al. | |
| 5,960,441 A | 9/1999 | Bland et al. | |
| 5,970,498 A * | 10/1999 | Duffield et al. | 707/104.1 |
| 5,984,502 A | 11/1999 | Calder | |
| 5,988,847 A | 11/1999 | McLaughlin et al. | |
| 6,008,985 A | 12/1999 | Lake et al. | |
| 6,014,612 A | 1/2000 | Larson et al. | |
| 6,033,257 A | 3/2000 | Lake et al. | |
| 6,041,263 A | 3/2000 | Boston et al. | |
| 6,047,221 A | 4/2000 | Piche et al. | |
| 6,055,483 A | 4/2000 | Lu | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,094,600 A | 7/2000 | Sharpe, Jr. et al. | |
| 6,106,785 A | 8/2000 | Havlena et al. | |
| 6,108,616 A | 8/2000 | Borchers et al. | |
| 6,110,214 A | 8/2000 | Klimasauskas | |
| 6,122,555 A | 9/2000 | Lu | |
| 6,128,279 A | 10/2000 | O'Neil et al. | |
| 6,175,934 B1 | 1/2001 | Hershey et al. | |
| 6,192,321 B1 | 2/2001 | Grumstrup et al. | |
| 6,272,469 B1 | 8/2001 | Koritzinsky et al. | |
| 6,298,454 B1 | 10/2001 | Schleiss et al. | |
| 6,332,110 B1 | 12/2001 | Wolfe | |
| 6,421,571 B1 * | 7/2002 | Spriggs et al. | 700/17 |
| 6,434,572 B2 | 8/2002 | Derzay et al. | |
| 6,445,962 B1 | 9/2002 | Blevins et al. | |
| 6,445,963 B1 | 9/2002 | Blevins et al. | |
| 6,449,715 B1 | 9/2002 | Krivoshein | |
| 6,510,353 B1 | 1/2003 | Gudaz et al. | |
| 6,577,908 B1 | 6/2003 | Wojsznis et al. | |
| 6,606,744 B1 * | 8/2003 | Mikurak | 717/174 |
| 6,633,782 B1 | 10/2003 | Schleiss et al. | |
| 6,671,818 B1 * | 12/2003 | Mikurak | 714/4 |
| 6,721,609 B1 | 4/2004 | Wojsznis et al. | |
| 6,789,030 B1 * | 9/2004 | Coyle et al. | 702/77 |
| 6,813,587 B2 | 11/2004 | McIntyre et al. | 702/183 |
| 7,080,066 B1 * | 7/2006 | Scheurich et al. | 707/3 |
| 7,086,009 B2 * | 8/2006 | Resnick et al. | 715/771 |
| 7,120,558 B2 * | 10/2006 | McIntyre et al. | 702/183 |
| 7,130,807 B1 * | 10/2006 | Mikurak | 705/7 |
| 7,165,226 B2 * | 1/2007 | Thurner et al. | 715/767 |
| 7,174,342 B1 * | 2/2007 | Scheurich et al. | 707/102 |
| 7,218,775 B2 * | 5/2007 | Kokko et al. | 382/156 |
| 2002/0022894 A1 | 2/2002 | Eryurek et al. | |
| 2002/0038156 A1 | 3/2002 | Eryurek et al. | |

| | | |
|---|---|---|
| 2002/0055790 A1 | 5/2002 | Havekost |
| 2002/0077711 A1 | 6/2002 | Nixon et al. |
| 2002/0123856 A1 | 9/2002 | Eryurek |
| 2002/0123864 A1 | 9/2002 | Eryurek et al. |
| 2002/0147506 A1 | 10/2002 | Eryurek et al. |
| 2002/0147511 A1 | 10/2002 | Eryurek et al. |
| 2002/0161940 A1 | 10/2002 | Eryurek et al. |
| 2002/0163427 A1 | 11/2002 | Eryurek et al. |
| 2002/0169514 A1 | 11/2002 | Eryurek et al. |
| 2003/0028268 A1 | 2/2003 | Eryurek et al. |
| 2003/0041135 A1 | 2/2003 | Keyes et al. |
| 2003/0067355 A1 | 4/2003 | Wojsznis et al. |
| 2003/0195934 A1 | 10/2003 | Peterson et al. |
| 2003/0200060 A1 | 10/2003 | Eryurek et al. |
| 2004/0075689 A1 | 4/2004 | Schleiss et al. |

OTHER PUBLICATIONS

Scott et al., U.S. Appl. No. 10/672,548, dated Sep. 26, 2003, "Integrated Configuration in a Process Plant Having a Process Control System and a Safety System".

"GE Predictor™ Services: GE Predictor Services Overview," GE Industrial Systems, available at http://www.geindustrial.com/cwc/services?id=71 on Apr. 11, 2003.

"Electrical Equipment Coverage," GE Industrial Systems, available at http://www.geindustrial.com/cwc/services?id=72 on Apr. 11, 2003.

"Customer Impact," GE Industrial Systems, available at http://www.geindustrial.com/cwc/services?id=73 on Apr. 11, 2003.

"Components of GE Predictor™ Services," GE Industrial Systems, available at http://www.geindustrial.com/cwc/services?id=74 on Apr. 11, 2003.

"Customer Benefits," GE Industrial Systems, available at http://www.geindustrial.com/cwc/services?id=75 on Apr. 11, 2003.

Dillon et al., U.S. Appl. No. 10/368,816, dated Feb. 19, 2003, "Open Network-Based Data Acquisition, Aggregation and Optimization for Use with Process Control Systems".

Nixon et al., U.S. Appl. No. 10/368,151, dated Feb. 18, 2003, "Module Class Objects in a Process Plant Configuration System".

Eryurek et al., U.S. Appl. No. 10/331974, dated Dec. 30, 2002, "Integrated Navigational Tree Importation and Generation in a Process Plant".

"LabVIEW® Scientific Software for the Macintosh," National Instruments Corporation, pp. 1-452 (1989).

Coote et al., "Graphical and Iconic Programming Languages for Distributed Process Control: An Object Oriented Approach," *IEEE*, pp. 183-190 (1988).

Elmqvist, "A Uniform Archtecture for Distributed Automation," *ISA*, pp. 1599-1608 (1991).

Elmqvist, "An Object and Data-flow Based Visual Language for Process Control," *ISA*, pp. 181-192 (1992).

Gensym Corporation, "G2 Reference Manual, Version 3.0," pp. 1-539 (1992).

Halpert, Object Oriented Programming for Motion Control, *IEEE*, pp. 58-68 (1991).

Ichikawa et al., "Visual Programming—Toward Realization of User-friendly Programming Environments," *IEEE*, pp. 129-137 (1987).

Johnson Yokogawa Corporation, "The JC-5000™ System Operator Command Station Engineer's Guide" (1990).

UCOS™ "The Only Truly Open Solution for Distributed Control" Control Systems International®.

International Preliminary Report on Patentability for International Application No. PCT/US05/09371, dated Aug. 7, 2007.

Written Opinion for International Application No. PCT/US05/09371, dated Aug. 12, 2007.

\* cited by examiner

INTEGRATED CONFIGURATION SYSTEM FOR USE IN A PROCESS PLANT

TECHNICAL FIELD

The present disclosure relates generally to configuring a process plant and, more particularly, to an integrated configuration system for use in a process plant that integrates the viewing and configuration activities associated with multiple applications used within the process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART® and Fieldbus field devices. The control modules in the process controllers send the control signals over the communication lines to the field devices to thereby control the operation of the process.

Information from the field devices and the process controllers is typically made available to one or more other hardware devices such as, for example, operator workstations, personal computers, handheld devices, data historians, report generators, centralized databases, etc. to enable an operator to perform desired functions with respect to the process such as, for example, changing settings of the process control routine, modifying the operation of the control modules within the process controllers or the smart field devices, viewing the current state of the process, viewing alarms generated by field devices and process controllers, simulating the operation of the process for the purpose of training personnel or testing the process control software, etc.

While a typical process plant has many process control and instrumentation devices such as valves, transmitters, sensors, etc. connected to one or more process controllers, which execute software that controls these devices during the operation of the process, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

Operator workstations, which are typically connected to the process controllers through communication connections such as a direct or wireless bus, Ethernet, modem, phone line, and the like, have processors and memories that are adapted to run software or firmware such as process control configuration applications. As an example, each of the DeltaV™ and Ovation control systems, sold by Emerson Process Management, includes multiple applications stored within and executed by different devices located at diverse places within a process plant. A process control configuration application, which may reside in one or more operator workstations, enables a user to create or change process control modules and download these process control modules via a data highway to distributed process controllers or field devices in the DeltaV™ and Ovation systems. Typically, these control modules are made up of communicatively interconnected function blocks, which are objects in an object-oriented programming protocol that perform functions within the control scheme based on inputs thereto, and provide outputs to other function blocks within the control scheme. Each process controller and, in some cases, the smart field devices, may store and execute a controller application that runs the control modules assigned and downloaded thereto to implement actual process control functionality.

The process control configuration application may also allow a user to create or change user interfaces, which are used by user interface applications to display data to an operator and to enable the operator to change settings, such as set points, within the process control routine. The user interface applications, which may be run on one or more operator workstations, receive data from the controller applications via the data highway and display this data to configuration engineers, process control operators, maintenance personnel, plant managers or supervisors, etc. using the user interfaces, and may provide any of a number of different views such as an engineering view, an operator's view, a maintenance view, a management view, etc.

User interface applications are typically implemented on a system-wide basis in one or more of the operator workstations, and provide preconfigured displays to the operator or maintenance personnel regarding the operating state of the process plant, or the devices within the process plant. Typically, these displays take the form of alarming displays that receive alarms generated by the process controllers or other devices within the process plant, control displays indicating the operating state of the process controllers and other devices within the process plant, maintenance displays indicating the operating state of the devices within the process plant, etc.

Many process plants, and especially those that use smart field devices, include applications that are used to help monitor and maintain the devices within the plant, regardless of whether these devices are process control and instrumentation devices or are other types of devices. For example, the Asset Management Solutions (AMS) Suite applications, sold by Emerson Process Management, enables communication with and stores data pertaining to field devices to ascertain and track the operating state of the field devices. An example of such a system is disclosed in U.S. Pat. No. 5,960,214 entitled "Integrated Communication Network for use in a Field Device Management System."

In some instances, the AMS application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. This information may be stored within the field device or within a field device database associated with the field device, and may be used by a maintenance person to monitor, maintain, and/or diagnose these field devices.

In addition, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, Liebert and ASCO companies, to control and maintain the power generation and distribution equipment.

It is also known to provide an expert system or application such as, for example, the OZ expert system currently provided by NEXUS, or any other type of expert system including, for example, any type of data mining system that uses process control variables and limited information about the operating condition of the process control routines, or function blocks or modules associated with the process control routines, to detect poorly operating loops and to provide information to an operator about suggested courses of action to correct the problem.

In addition, it is known to run control optimizer applications such as, for example, real-time optimizers (RTO+), within a process plant to optimize the control activities of the process plant. Such optimizer applications typically use complex algorithms and/or models of the process plant to predict how inputs may be changed to optimize operation of the process plant with respect to some desired optimization variable such as, for example, profit.

Still further, many process plants have other computers associated therewith that execute applications related to business functions such as applications associated with ordering raw materials, and replacement parts or devices for the process plant, as well as applications related to forecasting sales and production needs.

Typically, the various applications used in the same process plant are set up to be used by and configured by different people associated with the process plant. Generally speaking, configuration activities for each of these applications include providing information as to the types, locations, names, etc. of the devices disposed within the process plant as well as the manner in which the devices are communicatively interconnected to enable the applications to access information from or about those devices for use in control, maintenance and optimizer activities. Because these applications are run separately, by different people, the same configuration information is typically entered separately into the various applications at different times, resulting in the repetition of configuration activities.

For example, the process control configuration application and maintenance application typically used in the process plant are different, stand-alone programs in which a user must configure and view process set-up and other information using a process control configuration application running on a workstation. After the process is running, a user may switch to a separate application (or even a separate workstation) to configure a maintenance application (entering the same or similar information or data already provided to configure the process control configuration application) to view field device specific information. The configuration information may also be separately provided to an optimizer application, a business application, etc. This multi-step configuration process is time-consuming, results in redundancy in engineering effort, may be inconvenient and confusing to users, requires duplicate hardware, and requires that users be trained in multiple applications, all of which lead to extra costs in terms of configuring and running the process plant.

SUMMARY

An integrated configuration viewing system for use in a process plant includes a computer readable memory and a plurality of template configuration objects stored on the computer readable memory. Each of the plurality of template configuration objects includes a graphical representation of a physical entity within the process plant, a parameter storage adapted to communicate with the process plant to obtain and store device parameter information associated with the physical entity within the process plant, and a configuration storage adapted to store configuration parameters associated with the physical entity within the process plant. A first routine is stored on the computer readable memory and adapted to be executed on the processor to present a library section on a user interface. The library section is adapted to present depictions of the plurality of template configuration objects to a user via the user interface. A second routine is stored on the computer readable memory and adapted to be executed on the processor to present a configuration area on the user interface. And a third routine is stored on the computer readable memory and adapted to be executed on the processor to enable a user to select one of the plurality of template configuration objects from the library section and to place the selected template configuration object within the configuration area to create a process configuration module within the configuration area.

DETAILED DESCRIPTION

Figure 1:
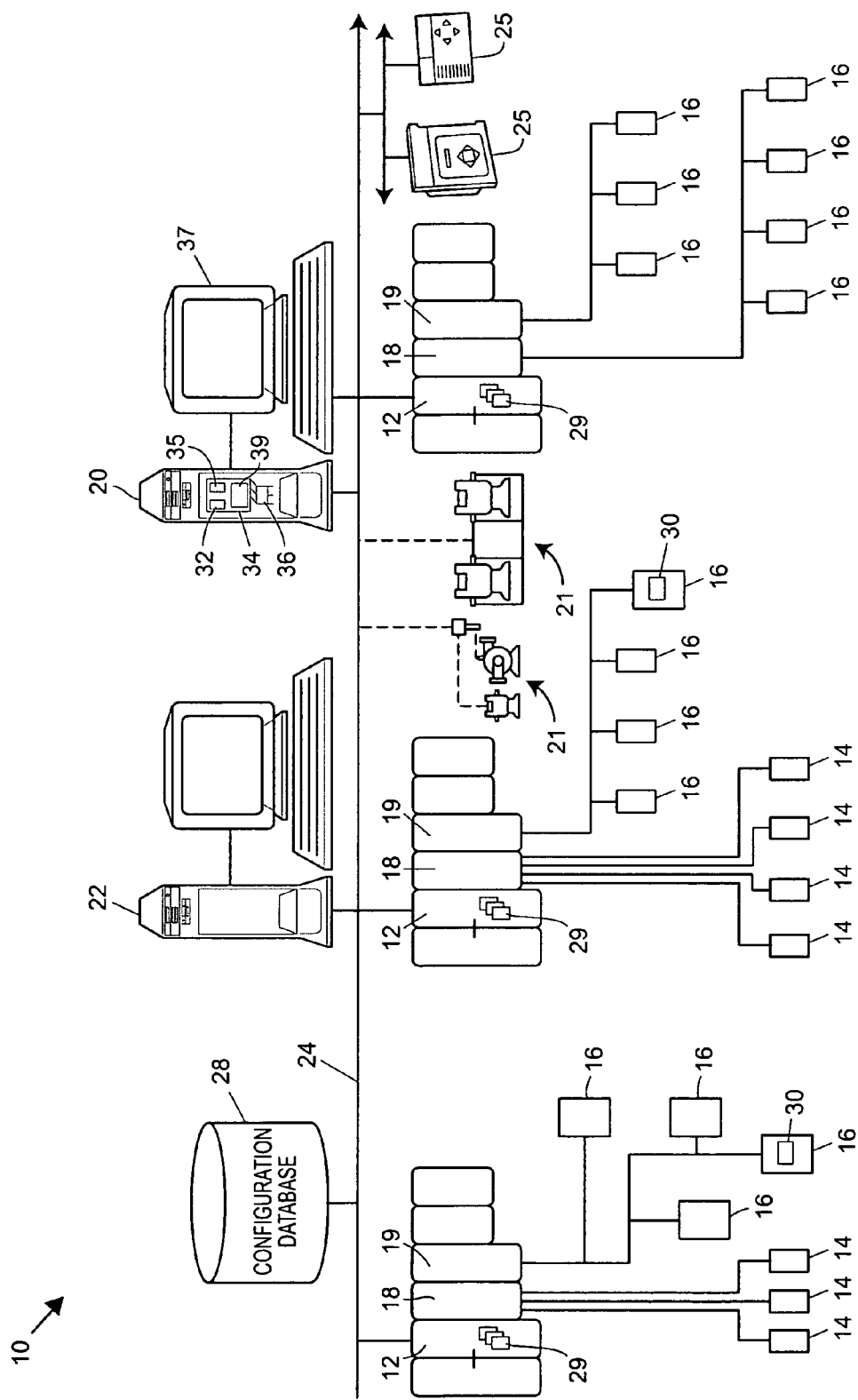
FIG. 1 is an exemplary block diagram of a distributed process control network located within a process plant including an operator workstation that executes an integrated process plant configuration system using configuration objects to form process configuration modules, which provide enhanced control, display, and simulation functions within the process plant.

Referring now to FIG. 1, an example process plant 10 includes an integrated configuration viewing system that uses configuration objects to form process configuration modules 39 to provide enhanced control, display, and simulation functions within the plant environment. Generally, the process plant 10 includes a distributed process control system having one or more process controllers 12, which may be a pair of redundant controllers. Each process controller 12 is connected to one or more field devices 14 and 16 via input/output (I/O) cards or devices 18 and 19, which may be any types of I/O devices conforming to any desired communication or controller protocol. The field devices 14 and 16 may be any types of field devices such as, for example, sensors, valves, transmitters, positioners, etc., and may conform to any desired open, proprietary or other communication or programming protocol.

The process plant 10 also includes one or more user interfaces or computers 20 and 22 (which may be any types of personal computers, workstations, etc.) that are accessible by plant personnel such as configuration engineers, process control operators, maintenance personnel, plant managers or supervisors, etc. The workstations 20 and 22 are coupled to the process controllers 12 via a communication line or bus 24 which may be implemented using any desired hardwired or wireless communication structure, and using any desired or suitable communication protocol such as, for example, an Ethernet protocol. The process controllers 12, the I/O devices 18 and 19, and the field devices 14 and 16 generally make up a process control system.

In addition, a database 28 may be connected to the communication bus 24 and operates as a data historian that collects and stores configuration information as well as online process parameter, status, and other data associated with the process controllers 12 and field devices 14 and 16 within the process plant 10. The database 28 may operate as a configuration database to store the current configuration, including process configuration modules as described below, as well as control configuration information for the process control system within the plant 10 as downloaded to and stored within the process controllers 12 and the field devices 14 and 16.

While the process controllers 12, I/O devices 18 and 19, and field devices 14 and 16 are typically located down within and distributed throughout the sometimes harsh plant environment, the workstations 20 and 22, and the database 28 are usually located in control rooms or other less harsh environments easily accessible by operators, maintenance personnel, etc.

As is known, the process controllers 12, which may be, for example, the DeltaV™ and Ovation controllers sold by Emerson Process Management, store and execute a controller application that implements a control strategy using a number of different, independently executed, control modules or blocks 29. The control modules may each be made up of what are commonly referred to as function blocks, wherein each function block is a part or a subroutine of an overall control routine and operates in conjunction with other function blocks (via communications called links) to implement process control loops within the process plant 10.

As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist such as model predictive controllers (MPCs), optimizers, etc. It is to be understood that while the Fieldbus protocol and the DeltaV™ system protocol use control modules 29 and function blocks designed and implemented in an object-oriented programming protocol, the control modules 29 may be designed using any desired control programming scheme including, for example, sequential function blocks, ladder logic, etc., and are not limited to being designed using function blocks or any other particular programming technique.

In the process plant 10 illustrated in FIG. 1, the field devices connected to the process controllers 12 may be conventional (i.e., non-smart) field devices 14 such as, for example, standard 4-20 mA devices that communicate over analog lines to the I/O device 18. Alternatively, or in addition, the field devices may be smart field devices 16 having a processor and a memory such as, for example, HART®, PROFIBUS®, Ethernet, or Fieldbus field devices, which communicate over a digital bus to the I/O device 19 using Fieldbus protocol communications. Smart field devices 16 may store and execute modules, or sub-modules such as function blocks 30 associated with the control strategy implemented in the process controllers 12. Function blocks 30, which are illustrated in FIG. 1 as being disposed in two different ones of the Fieldbus field devices 16, may be executed in conjunction with the execution of the control modules 29 within the process controllers 12 to implement process control as is well known. Of course, the field devices 14 and 16 may be any types of devices, such as sensors, valves, transmitters, positioners, etc., and the I/O devices 18 and 19 may be any types of I/O devices conforming to any desired communication or controller protocol such as HART®, PROFIBUS®, Fieldbus, etc.

The process plant 10 also includes various rotating equipment 21 such as, for example, turbines, motors, etc. connected to the communication bus 24. Similarly, power generating and distribution equipment 25 associated with the process plant 10 may also be connected to the communication bus 24. Of course, any other equipment and process control devices may be attached to or be part of the process plant 10, and the system described herein is not limited to the equipment specifically illustrated in FIG. 1, but may, instead or in addition, include any other types of process control equipment or devices.

In the process plant 10 of FIG. 1, the workstation 20 includes a plurality of applications and other data structures 32, which may be accessed by any authorized user such as, for example, a configuration engineer, a process operator, a maintenance person, a plant manager or supervisor, etc. to view and provide functionality with respect to devices, units, equipment, etc. located within the process plant 10. The plurality of applications 32 is stored in a computer readable memory 34 of the workstation 20, and each of the applications or entities within the plurality of applications 32 is adapted to be executed on a processor 36 associated with the workstation 20.

While the entire plurality of applications 32 is illustrated as being stored on the same workstation 20, some of these applications or other entities may be stored in and executed in other workstations or computer devices within or associated with the process plant 10 such as, for example, workstation 22. Furthermore, the applications within the plurality of applications 32 may be broken up and executed on two or more computers or machines and may be configured to operate in conjunction with one another.

The workstation 20 may further include user interface routines or applications 35 that receive and display information pertaining to the process plant 10 (or entities within or associated with the process plant 10) on a display screen 37 or display device associated with the workstation 20 such as, for example, a handheld device, laptop, other workstation, printer, etc. As will be described in more detail, the user interface applications 35 may generate one or more user displays, such as, for example, operator, maintenance and manager displays that enable a user to view and/or retrieve relevant information about different portions of the process plant, and that enable a user to graphically browse or navigate to different portions of the process plant in a desired manner based on depictions or displays of process control areas, units, loops, devices, etc. within the process plant 10.

Generally, the plurality of applications 32 may be used in conjunction with and configured using a set of process configuration modules 39, which may provide a simulation of an operation associated with a portion of a process plant 10. The process configuration modules 39 have graphics associated therewith to create process graphic displays, which generally provide a display pertaining to a portion of the process plant 10. The process graphic display elements, which will be described in more detail below, are generally elements that are used by an operator's display, an engineer's display, a maintenance person's display, a plant manager's or supervisor's display, or other displays to provide information to a user, such as an operator, about the operation, configuration, or set-up of the process plant 10 and the elements therein. An example of a process configuration module 39 is disclosed in U.S. patent application Ser. No. 10/278,469 entitled "Smart Process Modules and Objects in Process Plants" (filed Oct. 22, 2002), which is hereby expressly incorporated by reference herein.

The process configuration modules 39 may be used to simulate the operation of the process plant 10, or of some of the different elements therein connected in the manner depicted in the process graphic displays and, additionally, may be used to provide views to different users, such as operators, maintenance persons, business persons, etc. The views provide various information to these users including information generated by the applications 32. Although the process configuration modules 39 are illustrated as being stored in and executed by the workstation 20, the process configuration modules 39 may be downloaded to and executed in any other computer associated with the process plant 10 such as, for example, workstation 22, a laptop, a handheld device, etc.

Figure 2:
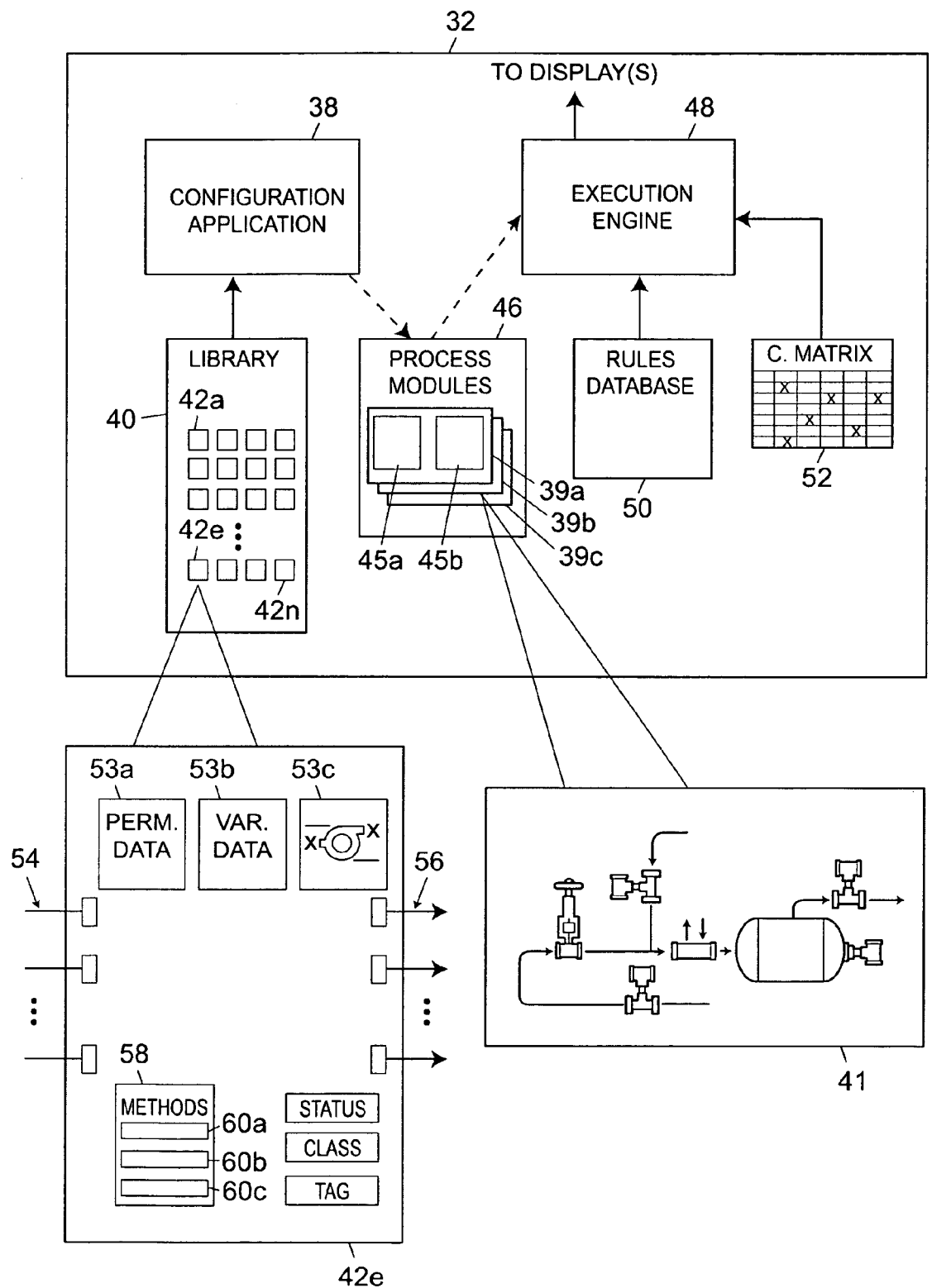
FIG. 2 is a logical block diagram of a configuration application and other entities, including configuration objects and process configuration modules, stored in the operator workstation of FIG. 1.

FIG. 2 illustrates some of the applications and data structures or other entities within the plurality of applications 32 stored in the computer readable memory 34 of the workstation 20. In particular, a configuration application 38 may be used by, for example, a configuration engineer to create process configuration modules 39 (also called process flow modules) and the associated graphic displays. More particularly, the configuration application 38 may create process configuration modules 39 using one or more configuration objects 42, the nature of which will be described in more detail below. Furthermore, while one configuration application 38 may create the process configuration modules 39, these process configuration modules 39 may be created by separate configuration applications. Still further, different ones of the plurality of applications 32 may be located in different geographical locations from each other and/or the process plant 10 and may be adapted to communicate via any suitable communication network such as, for example, the Internet, or other open network.

A plurality of configuration objects 42 may be stored on the computer readable memory 34 in a library 40 of predefined, example or template configuration objects 42. The library 40 may be accessed, copied, and used by the configuration application 38 to create one or more process configuration modules 39. Each process configuration module 39 is made up of or created from one or more configuration objects 42 and may include any number of objects connected together. In addition, each configuration object 42 may include one or more process flow or simulation algorithms 45, which are stored in a process configuration module memory 46.

As noted above, the configuration application 38 may be used to create one or more graphic displays 41, each of which is made up of or created from one or more configuration objects, and may include any number of display elements connected together. One of the graphic displays 41 is illustrated in FIG. 2 in expanded form, and includes a depiction of a set of process elements such as, for example, valves, tanks, sensors, and flow transmitters, interconnected by connection elements, which may be, for example, pipes, conduits, electrical cables, conveyors, etc.

An execution engine 48 executes or implements each of the process configuration modules 39 during runtime to create one or more process displays for an operator as defined by the graphic displays 41, and to implement simulation functionality associated with the process configuration modules 39. The execution engine 48 may use a rules database 50 defining the logic to be implemented on the process configuration modules 39 as a whole, and the configuration objects 42 within those modules 39 in particular. The execution engine 48 may also use a connection matrix 52, which defines the connections between the process elements within the process plant 10 as well as within the process configuration modules 39 to implement the functionality for the process configuration modules 39.

FIG. 2 illustrates one of the configuration objects 42e in more detail. While the configuration object 42e is illustrated as being one of the template configuration objects, it should be understood that other configuration objects will generally include the same or similar elements, features, parameters, etc. as described with respect to the configuration object 42e. In addition, it should be understood that the specifics or values of these elements, features and parameters may be changed or varied from configuration object 42 to configuration object 42 depending on the nature and use of that configuration object 42. Furthermore, while the configuration object 42e may be an object within an object-oriented programming environment and thus include data stores, inputs and outputs, and methods associated therewith, this configuration object 42e may be created by and implemented within any other desired programming paradigm or protocol.

As will be understood, the configuration object 42e, before being instantiated, is an object that is associated with a particular entity such as a physical or a logical entity within the process plant 10 of FIG. 1. However, after being copied and instantiated, the configuration object 42e may be tied to a particular entity within the process plant 10 so as to simulate the operation of that particular entity. In any event, the configuration object 42e includes a data store 53 that is used to communicate with the entity within the process plant 10 to which the configuration object 42e pertains and store device parameter information or data received from or pertaining to the entity with which the configuration object 42e is associated. The data store 53 generally includes a data store 53a that stores general or permanent information about the entity to which the configuration object 42e pertains, like manufacturer, revision, name, type, etc. A data store 53b may store variable or changing data, such as parameter data, status data, input and output data, cost or other data about the entity to which the configuration object 42e pertains, including configuration parameters associated with the entity, as well as data associated with the entity as it has existed in the past or as it now exists within the process plant 10. Of course, the configuration object 42e may be configured or programmed to receive this data (e.g., cost data) on a periodic or non-periodic basis, from the entity itself via any desired communication link, from the historian 28 via the communication bus 24, or in any other desired manner.

A data store 53c may store a graphical representation of the entity within the process plant 10 to which the configuration object 42e pertains, and which is used to produce the graphic displays 41 to the operator via an operator interface, such as the display screen 37 associated with the workstation 20 of FIG. 1. Of course, the graphical representation may include place holders (marked by underlines within the data store 53c) for information about the entity such as information defined by the parameter or other variable data about the entity as stored in the data store 53b. This parameter data may be displayed in the graphical place holders when the graphical representation is presented to the operator on the display device 37 as part of the graphic displays 41.

The graphical representation (and the configuration object 42e) may also include predefined connection points (marked by an "X" in the data store 53c) that enable a configuration engineer or operator to attach upstream or downstream components to the process element, as depicted by the graphical representation. Of course, these connection points also enable the configuration object 42e to be aware of the elements connected to that configuration object as configured within a process configuration module 39 and may specify a type of connection element that may be used such as, for example, a pipe, a duct, a stream associated with that element, etc.

The configuration object 42e may also include one or more inputs 54 and outputs 56 to enable communication with other configuration objects within or outside of a process configuration module 39 in which the configuration object 42e is used. As will be described in more detail below, the connections of the inputs 54 and outputs 56 to other configuration objects 42 may be configured by a configuration engineer during configuration of the process plant 10 by simply connecting other configuration objects 42 to these inputs 54 and outputs 56, or by specifying particular communications that are to take place between configuration objects 42.

Some of these inputs 54 and outputs 56 may be defined as being connected to the configuration objects connected at the predefined connection points for the configuration object as discussed above. These inputs 54 and outputs 56 may also be determined or defined by a set of rules within the rules database 50 and the connection matrix 52 defining the connections between different devices or entities within the process plant 10. The inputs 54 and the outputs 56, which include data stores or buffers associated therewith will generally be used to provide communications of data from other configuration objects to the configuration object 42e, or to provide communications of data stored within or generated by the configuration object 42e to other configuration objects. These inputs 54 and outputs 56 may also be used to provide communications between the configuration object 42e and other objects within the process control system such as, for example, control modules 29 located within the process controllers 12, smart field devices 16, etc.

As illustrated in FIG. 2, the configuration object 42e also includes a method storage 58 that is used to store zero, one or more methods 60 (illustrated as methods 60a, 60b and 60c in FIG. 2) to be implemented by the configuration object 42e during execution of a process configuration module 39 by the execution engine 48. Generally, the methods 60 stored in the method storage 58 will use the data stored within the data storage portions 53a and 53b and data obtained from other configuration objects or even data from other sources such as, for example, the configuration database or historian 28, via the inputs 54 and the outputs 56 to determine information about the process plant 10 or an entity within the process plant 10. For example, the methods 60 may determine poor or bad operating conditions associated with the entity defined by the configuration object 42e, errors associated with that or other entities within the process plant 10, etc.

The methods 60 may be preconfigured or provided based on the type or class of configuration object and will generally be executed each time the configuration object 42e is executed within the execution engine 48 during runtime. Some example methods 60 that may be provided within a configuration object such as, for example, the configuration object 42e, include detecting leaks, dead band, dead time, movement, variability, condition monitoring, computing costs, or other conditions associated with the entity.

The methods 60 may also be provided to help simulate the operation of the process entity associated with the configuration object or the material flowing through that process entity. Thus, the methods 60 may be provided to calculate mass balances, energy balances, flows, temperatures, compositions, vapor states, and other system-level or stream-level parameters associated with the material in the process plant 10 to simulate operation of the element and calculate expected outputs based on provided inputs, etc. Of course, these are but a few of the methods 60 that may be stored in and run by a configuration object 42e, and there are many other methods that may be used, with such methods generally being determined by the type of entity being represented, the manner in which that entity is connected in and used in a process plant 10 as well as other factors.

While the configuration object 42e may store and execute methods 60 that detect system-level conditions, errors, etc., these methods 60 may also be used to determine other information about devices, logical elements such as, for example, process configuration modules 39 and loops, and other non-system-level entities. If desired, the methods 60 may be programmed or provided in any desired programming language or infrastructure, such as C, C++, C#, XML, XSL, NET, etc., or may be referenced to or may define applicable rules within the rules database 50 that should be run for the configuration object 42*e* during execution.

Figure 3:
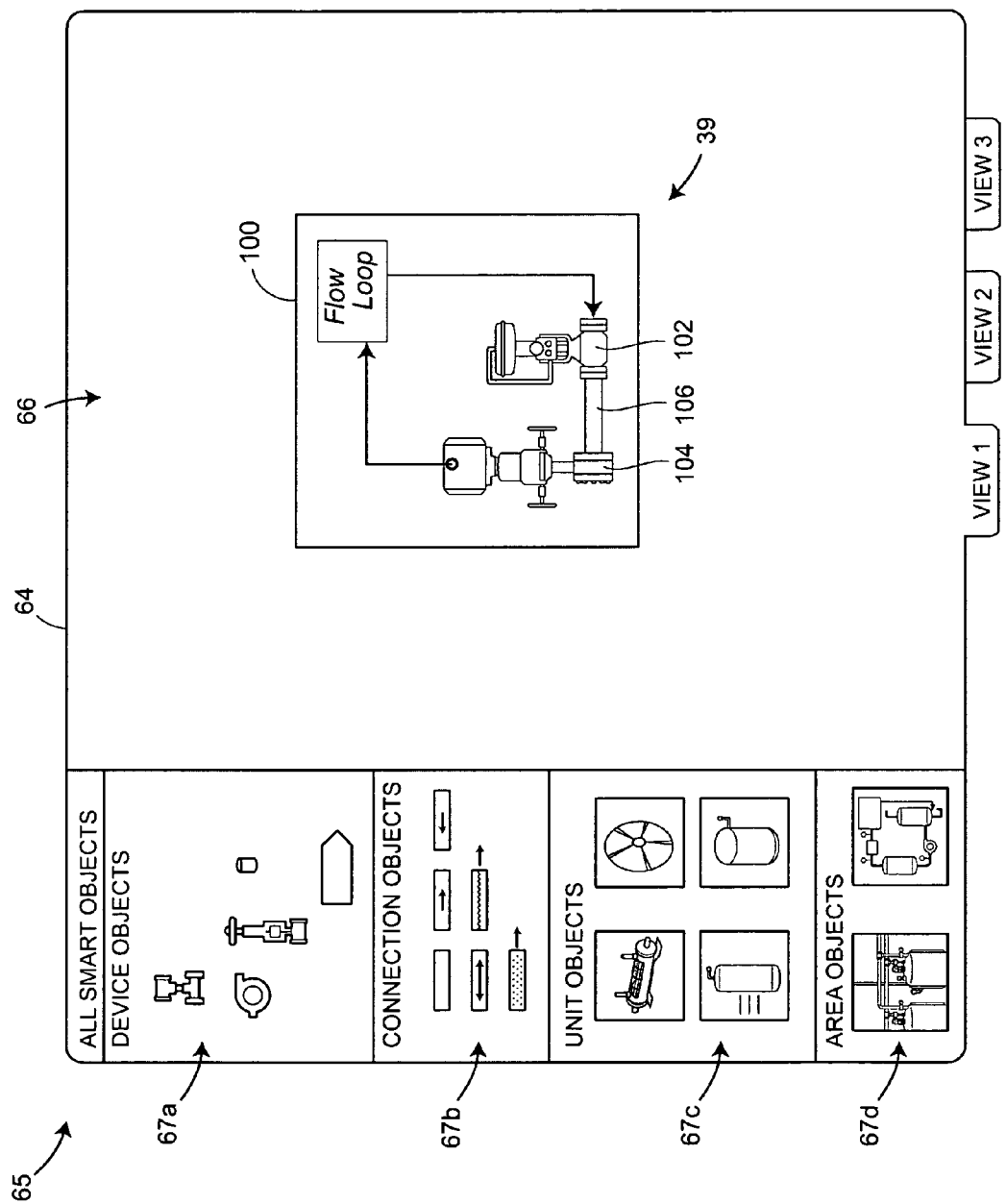
FIG. 3 is a simplified depiction of a configuration screen that may be used by a configuration engineer to create a process configuration module using configuration objects stored in an object library.

With reference to FIG. 3, a user or configuration engineer may run or execute the configuration application 38 to define the component devices, interconnections, and interrelationships within the process control environment by creating one or more process configuration modules 39 (using the configuration objects 42), which model the arrangement of physical entities and logical entities within the process plant 10. As seen in FIG. 3, the configuration display 64 includes a library or template section 65 (which includes the library 40 of FIG. 2) and a configuration section 66. In one embodiment, the configuration application 38 may include a routine stored on the computer readable memory 34 and adapted to be executed on the processor 36 to present the library or template section 65 (which includes the library 40 of FIG. 2) on the user interface or workstation 20. In addition, the configuration application 38 may include a routine stored on the computer readable memory 34 and adapted to be executed on the processor 36 to present a configuration display or area 64 on the user interface or workstation 20, such as that illustrated in FIG. 3, to the configuration engineer (or other user).

The library or template section 65 is adapted to present a graphical depiction of sets of template configuration objects 67, which may include the configuration objects 42 of FIG. 2, to a user via the user interface or workstation 20. The template configuration object 67 may be associated with any desired process entity such as, for example, a device object 67*a* representative of a device within the process plant 10, a connection object 67*b* representative of a connector element within the process plant 10, a unit object 67*c* representative of a unit within the process plant 10, and an area object 67*d* representative of an area of the process plant 10.

Device objects 67*a* may be associated with physical devices within the plant 10 that perform some function with respect to a stream of material such as, for example, valves, sensors, transmitters, pumps, eductors, dampers, feeders, etc. Connection objects 67*b* define the manner in which materials within the process plant 10 such as, for example, solid materials, liquid, vapor, electricity, and gases are delivered or carried from one device to another. More particularly, connection objects 67*b* may include pipes, ducts, conduits, conveyors, electrical cables, or any other device or entity that moves material from one point to another point within the process. Pipes are generally used to illustrate (and simulate) liquid and high pressure vapor or gas flow within the plant 10. Ducts are generally used to illustrate (and simulate) low pressure gas flow within the plant 10. Conveyors are generally used to illustrate (and simulate) the movement of solid material between processing units. And electrical cables are used to illustrate (and simulate) power flow in electro-chemical processes, etc. Arrows may be displayed with these connection objects 67*b* to show the direction of the material flow.

Each connection object 67*b* defines the type of connection that is used to provide material at the input or output of a device. In other words, a connection object 67*b* may begin at a device object 67*a* output or a unit object 67*c* output, and may terminate at a device object 67*a* input or a unit object 67*c* input. In addition, if an upstream output is common to two connections, a "T" element may be included in the connection object 67*b*. Similarly, "T" elements may be used to combine multiple outputs.

In some cases, a particular type of device object 67*a* may only be used with a specific type of connection object 67*b*. For example, a pipe may be used with only a valve, pump, eductor, or feeder. Similarly, a duct object may be set up to be used with a draft fan or damper drive or other device that provides flow of gas. Likewise, a conveyor may be used with only a feeder and a motor drive to simulate and depict the flow of solid materials.

Unit objects 67*c* may include a logical grouping of device objects 67*a* and connection objects 67*b* interconnected together, as well as other plant equipment that process or perform a function on the materials or streams in the plant 10 in some manner. Generally, all inputs and outputs to and from unit objects 67*c* may be made through connection objects 67*b*. Standard unit objects 67*c* include tanks (vertical and horizontal), mixers, reactors, air heaters, heat exchangers, compressors, turbines, distillation columns, evaporators, separators, boilers, or any other elements that perform some type of simple or standard processing activity, as well as the various device objects 67*a* and connection objects 67*b* associated with these units. Similarly, area objects 67*d* may include a logical grouping of unit objects 67*c*, device objects 67*a* and connection objects 67*b* interconnected together, as well as other plant equipment that process or perform a function on the materials or streams in the plant 10 in some manner.

Basically, the template configuration objects 67 are generic objects that may be provided from the system manufacturer to the user and that may be selected, dragged, and dropped on to the configuration section 66 to create an instance of a configuration object within a process configuration module 39. More particularly, to create a process configuration module 39, the configuration application 38 may include a routine stored on the computer readable memory 34 and adapted to be executed on the processor 36 that enables the configuration engineer (or some other user) to create the process configuration module 39 by selecting one of the template configuration objects 67 from the library or template section 65, dragging the selected template configuration object 67 to a desired location within the configuration section 66, and dropping or placing the selected template configuration object 67 within the desired location on the configuration section 66.

It is to be understood that the configuration engineer "selects" particular template configuration objects 67 in any conventional windowing manner such as, for example, by double-clicking on a template configuration object 67 with a mouse, by tapping or touching a particular template configuration object 67 on a touch-sensitive screen, or by entering a command on a keyboard.

As will be discussed in greater detail below, the routine may enable the configuration engineer (or some other user) to store the configuration parameters of the selected template configuration object within the data store 53 to create the process configuration module 39. The routine may further enable the configuration engineer (or some other user) to store data indicative of a communication attribute associated with the physical entity. The communication attribute may include a communication protocol, a communication connection type, a number of communication inputs/outputs, and/or a type of communication connection input/output.

The device objects 67 may be used to create higher-level configuration objects such as, for example, custom unit objects. Likewise, template unit objects may be used to create even higher-level objects such as, for example, custom area objects, etc., for each level of the equipment and logical hierarchy of a process control system. All of the custom or user-defined higher-level configuration objects may be stored in the library 40 along with the predefined template configuration objects 42 and later reused or used as a starting point for the creation of other custom configuration objects, including other unit and area configuration objects.

FIG. 3 illustrates an example of a process configuration module 39 for a flow loop that may be created using the template configuration objects 67 and the configuration application 38 described above. As illustrated in FIG. 3, the configuration engineer may create the process configuration module 39 by selecting, dragging, and dropping template device objects 67*a*, e.g., a valve 102 and a transmitter 104, onto the configuration section 66 in a desired location. The configuration engineer may interconnect the valve 102 and transmitter 104 by selecting, dragging, and dropping a template connection object 67*b*, e.g., a pipe 106, between the valve 102 and the transmitter 104.

Alternatively, a connection object may be created by holding the left mouse button down over an object output (such as, for example, a device object output or a unit object output) and, while holding down a button on the mouse, positioning the cursor over an object input (such as, for example, a device object input or a unit object input). For the connection to be established successfully, the input and the output types (pipe, duct, conveyor, etc.) of the upstream and downstream objects should match. The connection may automatically take on the type of the upstream object.

After specifying the configuration objects that make up a particular process configuration module 39, the configuration application 38 allows a configuration engineer to specify the attributes or properties associated with each process configuration module 39 (and the configuration objects 42 within the process configuration modules 39) using, for example, a pull-up menu, a pull-down menu, a pictographic menu, a dialog box, a pop-up menu, etc. associated with the configuration display 64. More particularly, each process configuration module 39 (and the configuration objects 42 within the process configuration module 39) may include physical or engineering attributes, control attributes, maintenance attributes, and management attributes.

During configuration of the process plant 10, a configuration engineer may completely define the attributes, methods, etc. for each process configuration module 39 of the process control system, and store the configuration information or parameters (e.g., the physical or engineering attributes, the communication attributes, the control attributes, the maintenance attributes, the process management information or business attributes, one or more display formats for displaying the device parameter information, etc.) in the data store 53. By specifying these different attributes for each process configuration module, the configuration activities formerly associated with the various different applications may be integrated into a single object usable by the various applications to provide various different views or types of information to different users.

Physical or engineering attributes may include a type, a size, a flow capacity, a volume, a surface area, a number of process input/output connections, a type of process input/output connections, a timing parameter, etc. associated with the actual physical object (such as a device, a unit, an area, etc.) being modeled by the process configuration module 39. As an example, physical or engineering attributes associated with a valve object may include the valve type (e.g., linear, quick opening, equal percentage, etc.), the valve size, the stroke time from open to close, the valve manufacturer and part number, the type of material flowing through the valve, and an indication of one or more engineering applications or tools that may access and use the device parameter information and/or configuration parameters to perform a data processing function with respect to the physical entity associated with the process configuration module and to produce process information related to the physical entity.

Control attributes may include a control strategy or routine, (including the function blocks that make up the control strategy), a type of control strategy or routine used to control the physical entity, values for one or more control parameters associated with control of the physical entity, references to the electrical inputs and outputs of the function blocks associated with the control strategy, setpoints, the initial values of the attributes, the default values (if appropriate) of the attributes, the range, i.e., high and low values, of the attributes, measurement units, limits, dead band, etc. The plurality of template configuration objects 67 may also include a simulation algorithm adapted to simulate operation of any entity within the process plant 10. As an example, a configuration engineer might create a control strategy for a tank unit object in which a fluid level in a tank is read by a level sensor, and compared with a predetermined desired level. The control strategy may then open or close a feed valve based on whether the fluid level is lower or higher than the predetermined desired level. The simulation algorithm may simulate the fluid level of the tank unit object, as read by the level sensor, and display an indication of the sensed fluid level on the display device 37.

Control attributes associated with a valve object may include the control strategy such as, for example, the function blocks, that are used to define and access a particular function to control the valve. A configuration engineer may associate the electrical inputs and outputs of the function blocks (i.e., AI, AO, DI, DO, etc.) with electrical signals or values produced or generated by various configuration objects (e.g., device objects 67*a* or unit objects 67*b*) that make up the process configuration module 39. In this manner, the configuration application 38 relates each of the functions defined by the function blocks according to the interconnections of the objects within the process configuration module 39 specified by the configuration engineer.

It is to be understood that each of the control function blocks (e.g., PID, MPC, fuzzy logic, neural network, etc.) in a control strategy includes an algorithm for performing a particular function and fixed parameters upon which the algorithm may operate to use the electrical inputs and outputs to provide the desired process control function. Thus, a configuration engineer may specify the parameters such as, for example, the setpoint, mode, status, etc. of the associated function block controlling that valve when setting or configuring a valve object, either by itself or as part of a higher-level process configuration module, such as a unit object, an area object, etc.

Other control attributes that may be associated with or specified for the process configuration module 39 by a configuration engineer include an indication of one or more control diagnostic applications or tools (e.g., DeltaV Inspect, RTO+, process control applications, control optimizer applications, process optimizer applications, modeling tools, expert applications, tuning routines, etc.) that may access and use the device parameter information and/or configuration parameters associated with the process configuration module to perform diagnostics with respect to controlling the physical entity and to produce process information related to the physical entity. In this manner, the various applications or tools are configured when the interconnections and interrelationships of the objects within each process configuration module are specified.

Examples of applications or systems related to the control strategy are disclosed in U.S. Pat. No. 6,445,963 entitled "Integrated Advanced Control Blocks in Process Control Systems" (filed Oct. 4, 1999), U.S. patent application Ser. No. 09/593,327 entitled "Integrated Optimal Model Predictive Control in a Process Control System" (filed Jun. 14, 2000), U.S. Pat. No. 6,577,908 entitled "Adaptive Feedback/Feedforward PID Controller" (filed Jun. 20, 2000), and U.S. Patent Pub. No. 2003/0067355 entitled "Model-Free Adaptation of a Process Controller" (filed Apr. 19, 2002), all of which are hereby expressly incorporated by reference herein. Examples of applications or systems related to tuning routines are disclosed in U.S. Pat. No. 6,445,962 entitled "Auto-Tuning in a Distributed Process Control Environment" (filed Mar. 15, 1999), U.S. Pat. No. 6,510,353 entitled "Determining Tuning Parameters for a Process Controller from a Robustness Map" (filed Nov. 4, 1999), and U.S. patent application Ser. No. 09/644,399 entitled "Control Loop Auto-Tuner with Nonlinear Tuning Rules Estimators" (filed Aug. 23, 2000), all of which are hereby expressly incorporated by reference herein. Examples of applications or system related to expert routines are disclosed in U.S. Pat. No. 6,633,782 entitled "Diagnostic Expert in a Process Control System" (filed Feb. 7, 2000) and U.S. Patent Pub. No. 2003/0028268 entitled "Data Sharing in a Process Plant" (filed Mar. 1, 2002), both of which are hereby expressly incorporated by reference herein.

In addition, control attributes may further include an indication of one or more alarm applications related to alarms and how alarms generated by the process configuration module 39 (and configuration objects within the process configuration module 39) are managed. For example, one or more alarm applications may be related to specifying the criticality of alarms. Control attributes may further include trending applications associated with the process configuration module 39 (and the configuration objects 42 within the process configuration module 39). Examples of applications or systems related to alarms are disclosed in U.S. Pat. No. 5,768,119 entitled "Process Control System Including Alarm Priority Adjustment" (filed Apr. 12, 1996), U.S. Patent Pub. No. 2002/0055790 entitled "Enhanced Device Alarms in a Process Control System" (filed Apr. 19, 2001), U.S. Patent Pub. No. 2002/0022894 entitled "Enhanced Fieldbus Device Alerts in a Process Control System" (filed May 21, 2001), U.S. Patent Pub. No. 2002/0147511 entitled "Enhanced Hart Device Alerts in a Process Control System" (filed Jun. 29, 2001), and U.S. Patent Pub. No. 2002/0163427 entitled "Integrated Device Alerts in a Process Control System" (filed Mar. 22, 2002), all of which are hereby expressly incorporated by reference herein.

Maintenance attributes may include information associated with operation of the physical entity that may be used by maintenance persons such as, for example, alarm configuration information (e.g., how alarms are to be setup, displayed and treated), device health information (e.g., the manner of displaying device health information), maintenance diagnostics information, an indication of one or more maintenance applications (e.g., device diagnostics applications, equipment maintenance applications and root cause applications) that may access and use the device parameter information and/or configuration parameters to perform maintenance-related data processing function with respect to the physical entity associated with the process configuration module and to produce process information related to the physical entity. Of course, maintenance attributes may include an indication of and configurations for any other maintenance-related data to provide access to such data and the manner of processing or viewing such data.

In a similar manner, business or process management attributes may include an indication of one or more applications that may access and use the device parameter information and/or configuration parameters associated with the process configuration module to perform an appropriate data processing function (e.g., creating graphs), as well as to produce and provide process information that a manager needs to make decisions about what to produce, whether the plant is operating satisfactorily, etc.

In addition, the process configuration module 39 may include simulation algorithms that calculate parameters associated with a device such as, for example, the discharge pressure, mass flow, liquid temperature, liquid composition, inlet pressure, outlet pressure, etc. of a valve. Of course, the simulation algorithms available to simulate the operation of a valve or the material flowing through the valve may be dependent upon the type of valve and sizing information, which were provided as engineering attributes. As discussed in further detail below, these simulated or calculated parameters may be exposed in a process operator's view, if so desired.

A configuration engineer may also specify maintenance attributes associated with the valve object such as, for example, an indication of one or more applications (e.g., the AMS application, data analysis and diagnostic tools, control diagnostic applications, device diagnostic applications, index generation applications, performance tracking tools, root cause applications, plugged line detection applications, device status applications, equipment monitoring applications, power management and power equipment monitoring and analysis tools, etc.) that may access and use the device parameter information and/or configuration parameters associated with the process configuration module to perform a data processing function with respect to the physical entity associated with the process configuration module and to produce process information related to the physical entity. Examples of applications or systems that are related to maintenance and/or diagnostics are disclosed in U.S. Pat. No. 6,094,600 entitled "System and Method for Managing a Transaction Database of Records of Changes to Field Device Configurations" (filed Feb. 6, 1996), U.S. Pat. No. 6,298,454 entitled "Diagnostics in a Process Control System" (filed Feb. 22, 1999), U.S. Patent Pub. No. 2002/0038156 entitled "Root Cause Diagnostics" (filed Oct. 5, 2001), U.S. Patent Pub. No. 2002/0123856 entitled "Cavitation Detection in a Process Plant" (filed Jan. 10, 2002), U.S. Patent Pub. No. 2002/0161940 entitled "Creation and Display of Indices Within a Process Plant" (filed Feb. 28, 2002), and U.S. Patent Pub. No. 2003/0200060 entitled "On-Line Rotating Equipment Monitoring Device" (filed Apr. 22, 2002), all of which are hereby expressly incorporated by reference herein.

Likewise, a configuration engineer may specify the business or process management attributes associated with the process configuration module 39 such as, for example, a product type, a throughput, an efficiency, an uptime, a downtime, a yield, an indication of one or more applications (e.g., RTO+, enterprise resource planning applications, materials resource planning applications, plant management applications, process management applications, index generation applications, work order generation applications, etc.) that may access and use the device parameter information and/or configuration parameters associated with the process configuration module 39 to perform a data processing function with respect to the physical entity and to produce process information related to the physical entity. Examples of applications or systems that are related to business or management functions are disclosed in U.S. Patent Pub. No. 2002/0147506 entitled "Fiducial Technique for Estimating and Using Degradation Levels in a Process Plant" (filed Feb. 28, 2002), and U.S. Patent Pub. No. 2002/0169514 entitled "Automatic Work Order/Parts Order Generation and Tracking" (filed Feb.

28, 2002), both of which are hereby expressly incorporated by reference herein. As with the control attributes, the various applications specified with the maintenance and management attributes are configured when the interconnections and interrelationships of the objects within each process configuration module are specified.

Figure 4:
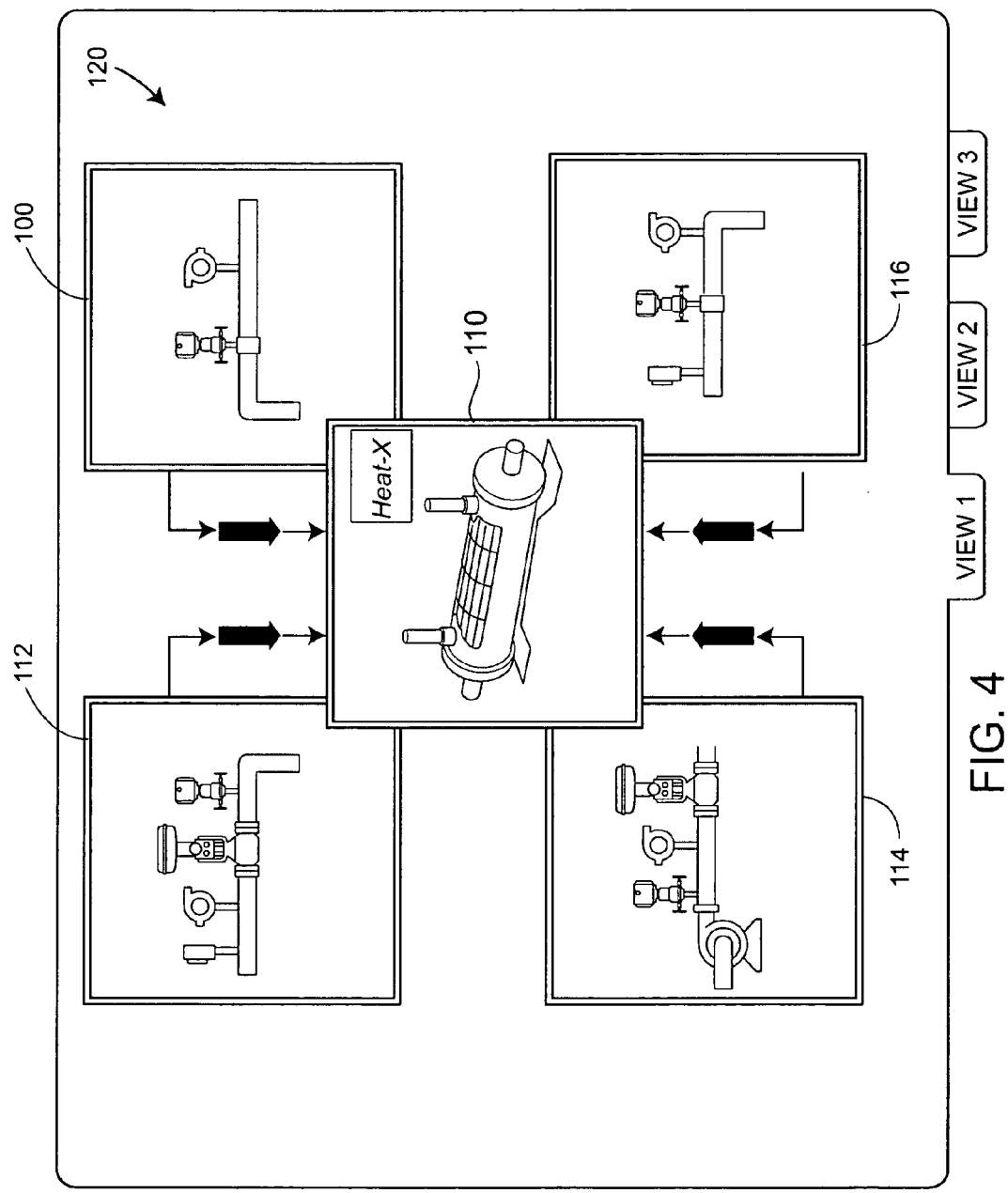
FIG. 4 is a simplified depiction of a configuration screen illustrating a process configuration module that includes several unit objects interconnected together.

If desired, the configuration engineer may store a process configuration module 39 in the configuration object library 40 as a custom or user-defined device object 67a to create a device process module representative of a field device within the process plant 10. Additionally, the configuration engineer may store a process configuration module 39 in the configuration object library 40 as a unit object 67c such as, for example, a flow loop unit object 100 (illustrated in FIG. 3) to create a unit process module representative of a unit within the process plant 10. Still further, the configuration engineer may store a process configuration module 39 in the configuration object library 40 as a custom or user-defined area object 67d to create an area process module representative of an area within the process plant 10. Each of the custom or user-defined device, unit and area objects 67a, 67c and 67d may include their own data store 53, inputs 54, outputs 56 and methods 60 associated therewith. In this manner, the configuration engineer may access and reuse the flow loop unit object 100, for example, when configuring or creating other higher-level process configuration modules 39. FIG. 4 illustrates a manner in which different unit objects 100, 110, 112, 114, and 116 may be connected together to form a higher-level unit object 120 to illustrate (or simulate) a portion of the process plant 10. As illustrated in FIG. 4, the unit object 120 is made by connecting the flow loop unit object 100 of FIG. 3, as well as other unit objects 110, 112, 114, and 116, which may be either predefined, template unit objects 67c (such as, for example, the template heat exchanger unit object 110) or custom, user-defined unit objects.

To create the configuration object 120 of FIG. 4, a configuration engineer may connect the outputs of the input flow loop unit objects 112 and 114 to inputs of the heat exchanger device object 110 using any desired drag-and-drop technique, any pull-down menus, etc. Similarly, the configuration engineer may connect the outputs of the heat exchanger device object 110 to the inputs of the output flow loop unit objects 100 and 116 in any desired manner. The configuration engineer may then store the created configuration object 120 in the configuration object library 40 as either a unit object (such as a heat exchanger unit object) or as part of an area object.

Figure 5:
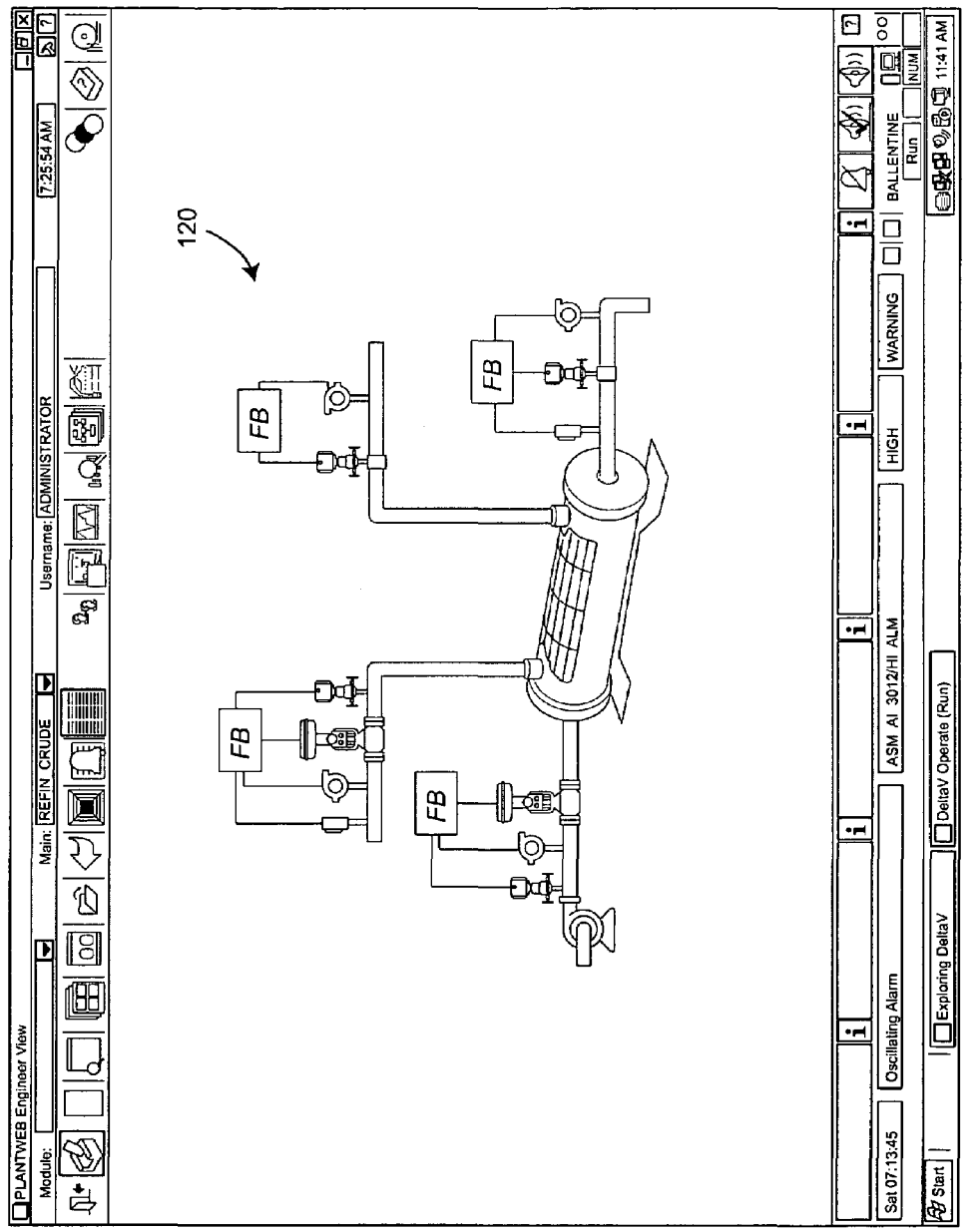
FIG. 5 is a simplified depiction of a configuration screen that illustrates an area object that may be stored in the object library.

FIG. 5 illustrates an example of the unit object 120 that may be created and stored in the library 40, using the display routine of FIG. 4 so that it may be accessed and used by the configuration engineer. Of course, the created unit object 120 includes its own data store 53, inputs 54, outputs 56, and methods 60. In addition, because the unit object 120 contains all of the attributes (e.g., engineering attributes, control attributes, maintenance attributes, management attributes, etc.) specified for the process configuration modules 39 of the lower-level device or unit objects, the configuration engineer does not need to specify the attributes associated with the unit objects (and device objects that make up the unit object). Instead, by building up the unit object 120 from other device and unit objects, the unit object 120 may automatically include and have access to all of the attributes stored for each of those objects, which the unit object 120 contains. Of course, additional attributes, including control, maintenance, management, etc. attributes may be specified for the unit object 120 as a whole.

Figure 6:
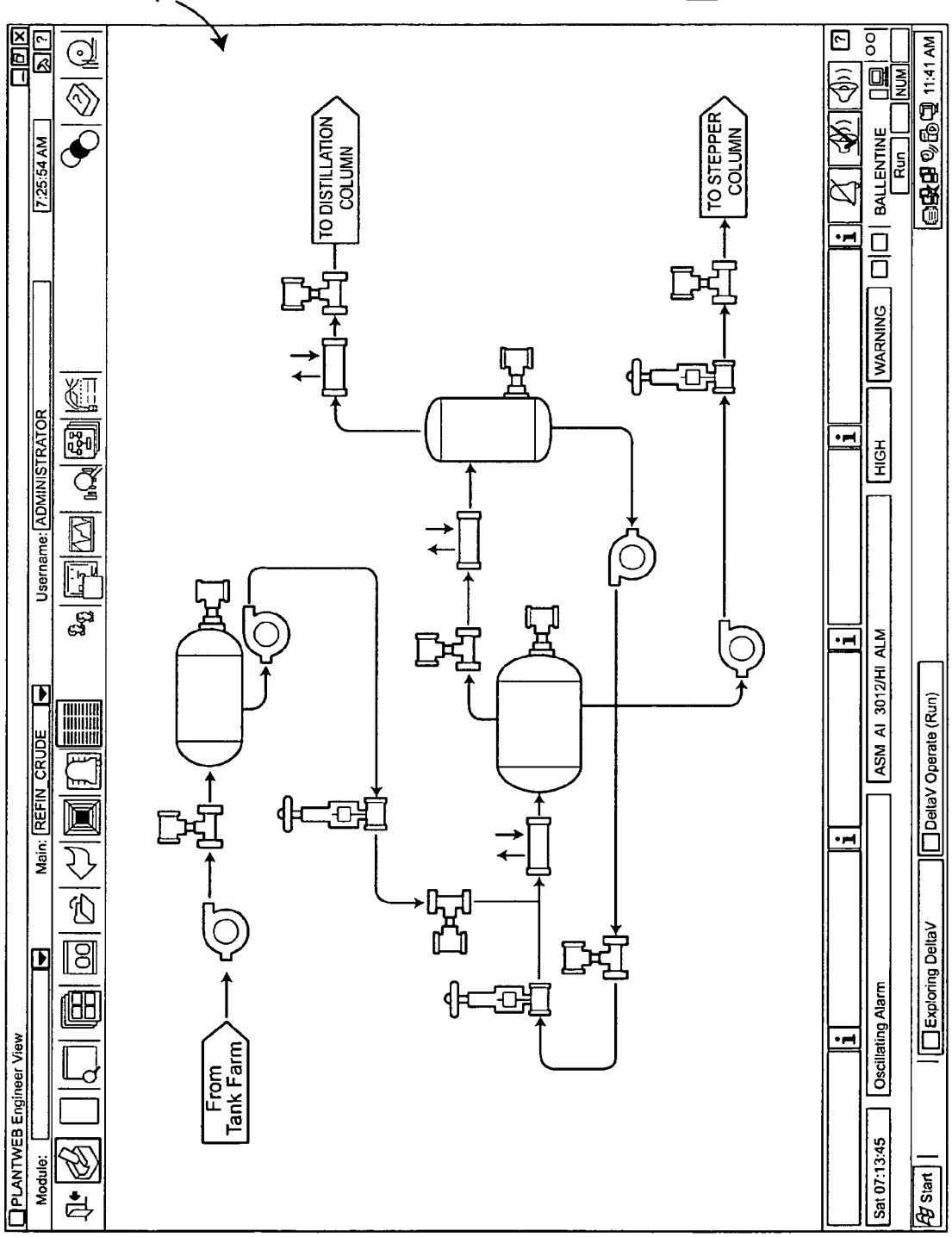
FIG. 6 is a simplified depiction of a screen display of a portion of a process plant that may be generated by the process configuration modules using the configuration objects.

FIG. 6 illustrates an example screen display 130 for an area object that may be created using lower-level process configuration modules 39 and the configuration application 38 discussed above. The interconnected entities on the screen display 130 may be configured by a configuration engineer using the configuration application 38 described above, and may be displayed on the display device 37 by the execution engine 48 during runtime of a process configuration module 39. Furthermore, each of the entities such as, for example, the tanks, flow transmitters, valves, etc., as well as the connectors therebetween, depicted on the screen 130 may be generated by or associated with configuration objects 42 within a process configuration module 39 and the graphical representations associated with the configuration objects. Still further, while the entities depicted on the screen display 130 include tanks, pumps, flow transmitters, valves, lines, etc., connected in a particular configuration, any other process entities, including hardware devices and software or logical elements such as control loops, control modules, function blocks, etc. may be depicted within the screen display 130 in any desired configuration.

During execution of a process configuration module 39 by the execution engine 48, the engine 48 implements the communications defined by the inputs 54 and outputs 56 to each of the configuration objects in the process configuration module 39, and may implement the methods 60 for each of those objects to perform the functionality provided by the methods 60. As noted above, the functionality of the methods 60 may be located in programming within the configuration object, or defined by a set of rules within the rules database 50 that the engine 48 executes based on the type, class, identification, tag name, etc. of a configuration object to implement the functionality defined by those rules.

It should be noted that an instance of the configuration object has a tag or unique name within the context of the process configuration module 39 with which the configuration object is associated. This tag or unique name may be used to provide communications to and from the configuration object, and may be referenced by the execution engine 48 during runtime. Process configuration module tags may be unique within the process control system configuration. This tagging convention enables elements within the process configuration modules 39 to be referenced by elements within others of the process configuration modules 39.

Still further, the parameters of the configuration object may be simple parameters such as simple values, structured parameters, or parameters that know the expected units and attributes associated therewith. Smart parameters may be interpreted and used by the process rules engine or execution engine 48 to assure that all signals are being sent in the same units, or are converted properly. Smart rules may also be used to turn on and turn off groups of alarms for the configuration objects (or process configuration modules 39) to create a smart alarm strategy and/or interface for the operator. Still further, configuration object classes may be associated with equipment and module classes within the process control strategy of the plant 10 to provide a known linkage between a configuration object and the process variables it will need to interpret or access.

Configuration objects, when used in process configuration modules 39, may also include mode of operation, status, and alarm behavior so that these configuration objects may be put in different modes during runtime such as, for example, off, start-up, and normal modes, may provide a status associated with the object based on its current operating state, and may provide alarms based on detected conditions such as, for example, a parameter out of range, limited, high variability, etc. Configuration objects may also have a class/subclass hierarchy, which enables them to be categorized in class libraries, to be collected together in a composite structure, etc. Still further, configuration objects may use information from other elements such as, for example, process configuration modules 39 and other objects to enable the configuration object to recognize when its associated entity is busy or, for example, acquired by a batch control process within the process plant 10.

Configuration objects that are associated with connectors, sometimes referred to herein as smart links or connection objects, are also tagged (even though the actual device or connector itself may not be tagged or able to communicate within the process plant 10) and are generally used to represent material flow between other elements in the process. Smart links will typically include properties or parameters that define how different materials or phenomena (such as electricity) flow through the connection (e.g. steam, electricity, water, sewage, etc). These parameters may indicate the type and nature of flow (such as the general speed, friction coefficients, type of flow such as turbulent or nonturbulent, electromagnetic, etc.) through the connector and the possible direction or directions of flow through the connector. Smart links may include programming or methods that ensure that the units of the source and destination object to which the smart link connects, match and, if not, may perform a conversion. The methods of the smart link may also model the flow through the connector using a model or an algorithm to estimate the speed or nature of the flow through the actual connectors, length and size of the physical connections, transport delay, etc. The stored parameters for the configuration object (such as friction parameters) may be used in these methods. Thus, the smart links or connection objects enable configuration objects to be aware of the other upstream and downstream objects or entities.

Of course, smart links may, for example, define the connections between other objects, the type of fluid, such as liquid, gas, electricity, etc. within the system, the upstream and downstream side of the entities, which other entities are upstream and downstream of the entity for this configuration object, the direction of material, fluid, electric flow, etc. in any desired or convenient manner.

In one embodiment, the connection matrix 52 may be created prior to execution of the process configuration modules 39, and may define for the smart links the interconnections between the different devices within the process plant 10 and, therefore, the interconnections between the different configuration objects. In fact, the execution engine 48 may use the matrix 52 to ascertain the upstream and downstream entities, and thereby define the communications between the configuration objects and the methods associated with the configuration objects. Still further, one or more set of rules may be provided to be used by the configuration objects to interact with each other, to obtain data from each other as needed for the methods within the configuration objects, and to resolve the impact of configuration objects associated with output connections.

If desired, the configuration object may also include hot links, such as URLs, to key documentation which may be applicable to the type of object, or which may be specific to the instance (depending on the criticality and application) of the device to which the configuration object pertains. The documentation may be vendor supplied, as well as user specific. Some examples of documentation include configuration, start-up and shut-down procedures, operational and maintenance documentation, etc. If desired, an operator may click on the object as displayed in an operator display to bring up the instance specific (if any) and generic documentation for the object or associated device. Also, the operator may be able to add/delete/change documentation independently of the system software such as, for example, maintenance requests, records of operational problems, etc. Furthermore, these hot links may be user configurable or changeable to provide the ability to add knowledge links to objects in the operator interface, to provide for quick navigation to appropriate information associated with the object, and to provide the ability to add work instructions specific to the customer, to the specific object type, or even to the specific instance of the object.

Once the configuration engineer has completed the configuration of the process configuration modules 39 (and the configuration objects within the process configuration modules 39), which reflect the physical layout of devices and equipment within the process plant 10 using the configuration application 38, and once the process configuration modules 39 (and associated configuration objects 42), as well as the plurality of applications 32 implemented in the process control system, are communicatively coupled to the individual process entities within the process plant 10, the execution engine 48 may execute or implement each of the process configuration modules 39. More specifically, the execution engine 48 may include a routine stored on the computer readable memory 34 and adapted to be executed on the processor 36 that executes or implements each of the process configuration modules 39 during runtime to obtain device parameter information from the process plant 10 pertaining to the entity associated with the process configuration module 39 and to make the obtained device parameter information and the process information produced by the various applications available to the user via the user interfaces or workstations 20 and 22 in conjunction with the graphical representation of the entity. More specifically, the routine may display the device parameter information on the user interfaces or workstations 20 and 22 according to one or more display formats specified during configuration of the process plant 10.

The device parameter information and the process information produced by the various applications may be made available to or presented on the user interfaces or workstations 20 and 22 by creating one or more process displays or views for a user as defined by the graphic displays 41 and the display format. The graphic displays 41 created by execution of the process configuration modules 39 are designed to dynamically show online measurements and actuators that interface with the process control system. In addition, unmeasured parameters, which reflect process operation, may be calculated using online process simulation provided in the process configuration modules 39 and may be shown as an integral part of the associated graphic displays.

As noted above, the user may, as part of the process configuration module 39 creation or configuration process, attach or provide process flow algorithms 45 to the process configuration module 39. These process flow algorithms 45 may be preconfigured to calculate or determine certain process or system-level properties such as, for example, mass balance calculations, flow calculations, efficiency calculations, economic calculations, etc. with respect to the process depicted or modeled by the process configuration module 39. As a result, the process configuration modules 39 themselves may have mode, status, and alarm behavior, may be assigned to workstations, and may be downloaded as part of the display downloads.

If desired, the flow algorithms may be executed by a separate or different execution engine or by the execution engine 48 to perform mass or heat balancing, flow routing, flow efficiency, flow optimization, economic calculations related to flow, or other desired flow-related calculations using the data provided in the process objects of the process flow module 39. Still further, these flow algorithms 45 may access parameters from the control strategy and may, conversely, provide data or information to the control strategy.

As explained above, the process configuration modules 39 are constructed or built by building graphic displays 41 for these modules 39, and then by specifying flow algorithms 45 to be used in or associated with these process configuration modules 39. Of course, individual process configuration modules 39 may be spread across and executed by different computers, and process configuration modules 39 may be communicatively coupled to one another to operate in conjunction with each other, either on the same or on different computers.

It will be understood that the process configuration modules may be built up and interconnected as described above to create a model of the physical and logical layout of the process control system in a manner such that the configuration, control, and display activities may be integrated. Advantageously, these process configuration modules may be used by different applications to obtain information from the process plant 10 and to create different views or display formats for use by different users to provide different types of information to those different users.

In particular, while in the past, different applications such as maintenance, optimizer, control, business, etc. applications each had to be set up and configured separately, these applications may now be communicatively coupled to the process configuration modules as created above without the need to configure each of the applications separately. In fact, the process configuration modules, once created for a process plant, may be accessed by any application to enable the application to obtain the device parameter information, configuration parameters, online data, etc. that the application needs to operate and to perform the various data processing functions (e.g., the maintenance, control, business, optimizer, etc. functions), as well as to produce process information.

Thus, once the process configuration modules are created for a process plant, additional, separate configuration activities need not generally be performed because all of the process plant supporting applications, such as business, maintenance, optimizer and control applications, may be communicatively coupled to the appropriate process configuration modules to obtain the information (e.g., configuration parameters and/or device parameter information) these applications need from the process plant. This information may be obtained from the appropriate process configuration modules because all of the process plant information flows through the process configuration modules. Additionally, the process configuration modules (because they include the engineering, maintenance, control and management attributes) may include an indication of or use one or more supporting applications to create or enable a display or view to be created. The display or view created by the process configuration modules may provide different types of information to different users by using the device parameter information and/or the configuration parameters.

Figure 7:
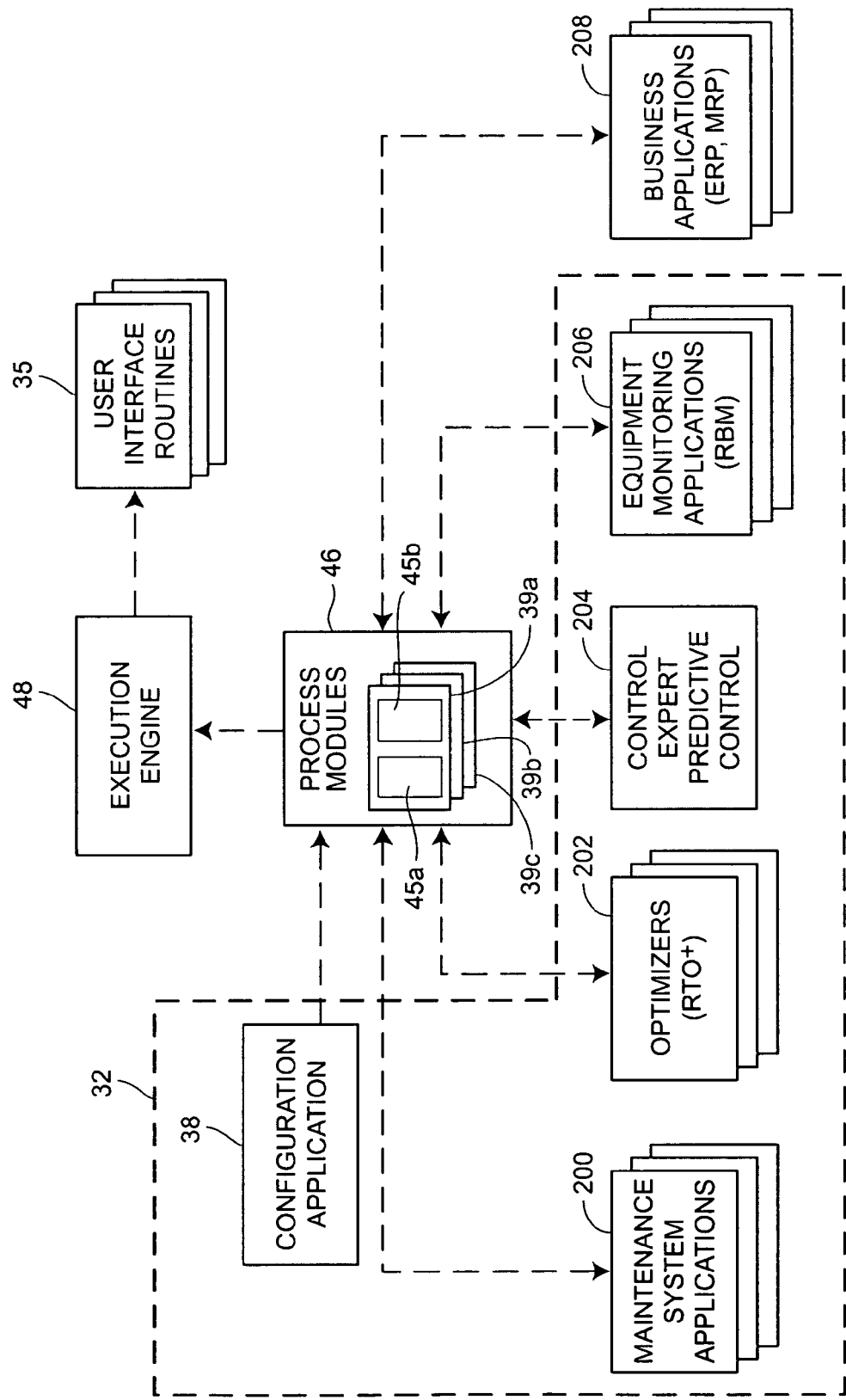
FIG. 7 is an exemplary block diagram of the integrated configuration system, which includes the process configuration modules and a plurality of applications that access data from and provide data to the process configuration modules.

FIG. 7 illustrates a manner in which supporting applications, including the plurality of applications 32, may access data from and provide data to the process configuration modules 39 as they are being executed on the execution engine 48. In particular, maintenance system applications 200, optimizer applications 202, expert system or predictive control applications 204, and equipment monitoring applications 206, as well as any desired business applications 208 are communicatively coupled to the process configuration modules 39 and may obtain any desired information from these process configuration modules 39 for any desired purposes. Of course, the applications 200-208 may communicate with the process configuration modules 39 (as they are being executed in the execution engine 48) using the tags associated with the process configuration modules 39. As a result, whenever one of the applications 200-208 is executed, it may obtain the information it needs from the process configuration modules 39 as already set up, instead of having to be configured separately to identify where the application needs to go (within the process plant 10) to access or obtain the information it needs.

Additionally, because the process configuration modules 39 are configured to include engineering, maintenance, control and management attributes, these process configuration modules 39 may automatically refer to specific ones of the applications 200-208, or specific information provided by these applications 200-208 which are relevant to these different activities. As a result, the user interface routines 35 may create different user displays or views for different users (e.g., business persons, maintenance persons, control operators, etc.) automatically from the process configuration modules 39. In particular, the user interface routines 35 may use the graphic displays 41 associated with the process configuration modules 39, the attributes specified for the process configuration modules 39, and one or more display formats to enable users to view different types of information about any portion of the process plant 10.

Figure 8:
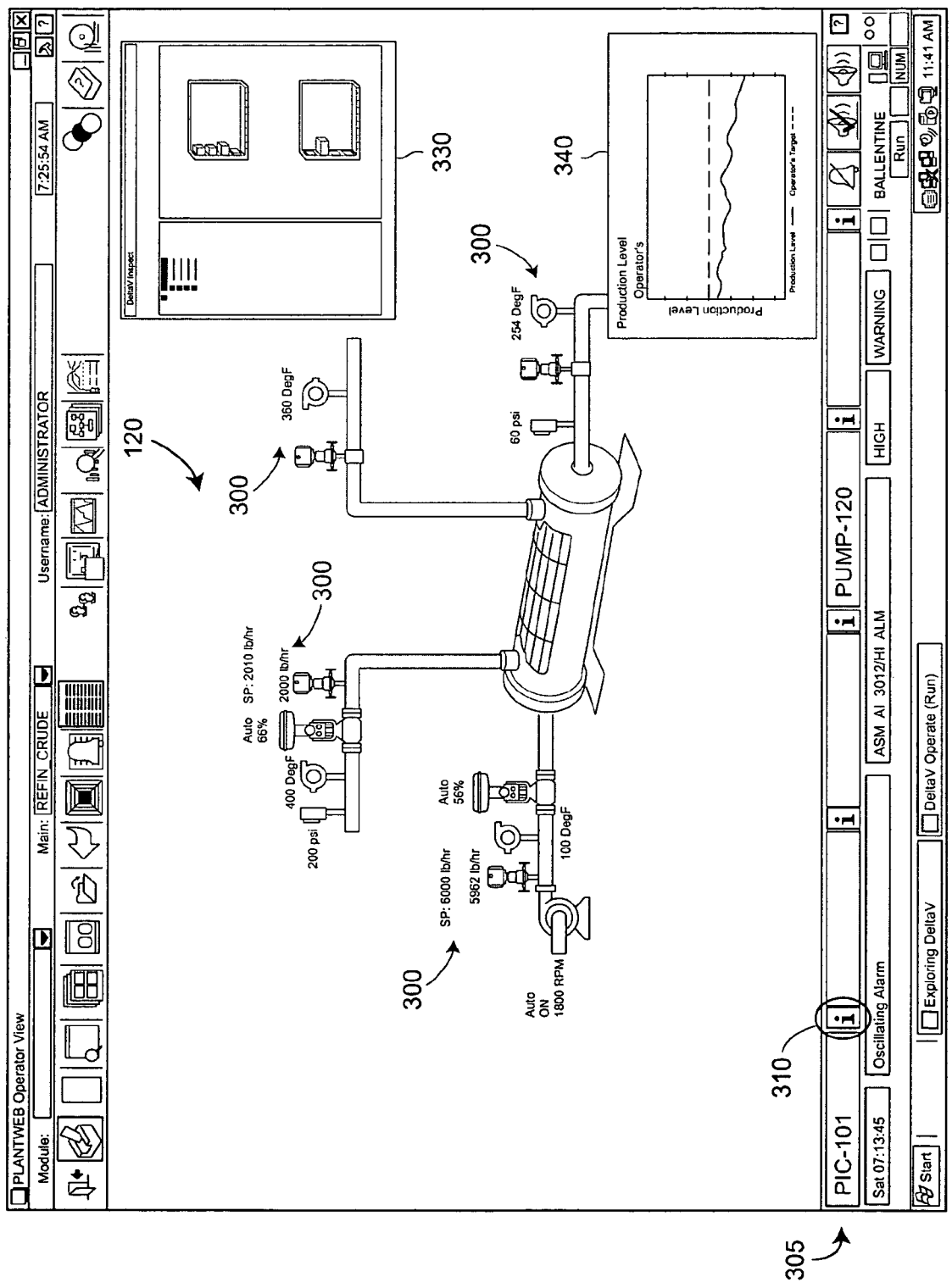
FIG. 8 illustrates a screen display of a control operator's view of particular entities associated with the process plant.
Figure 9:
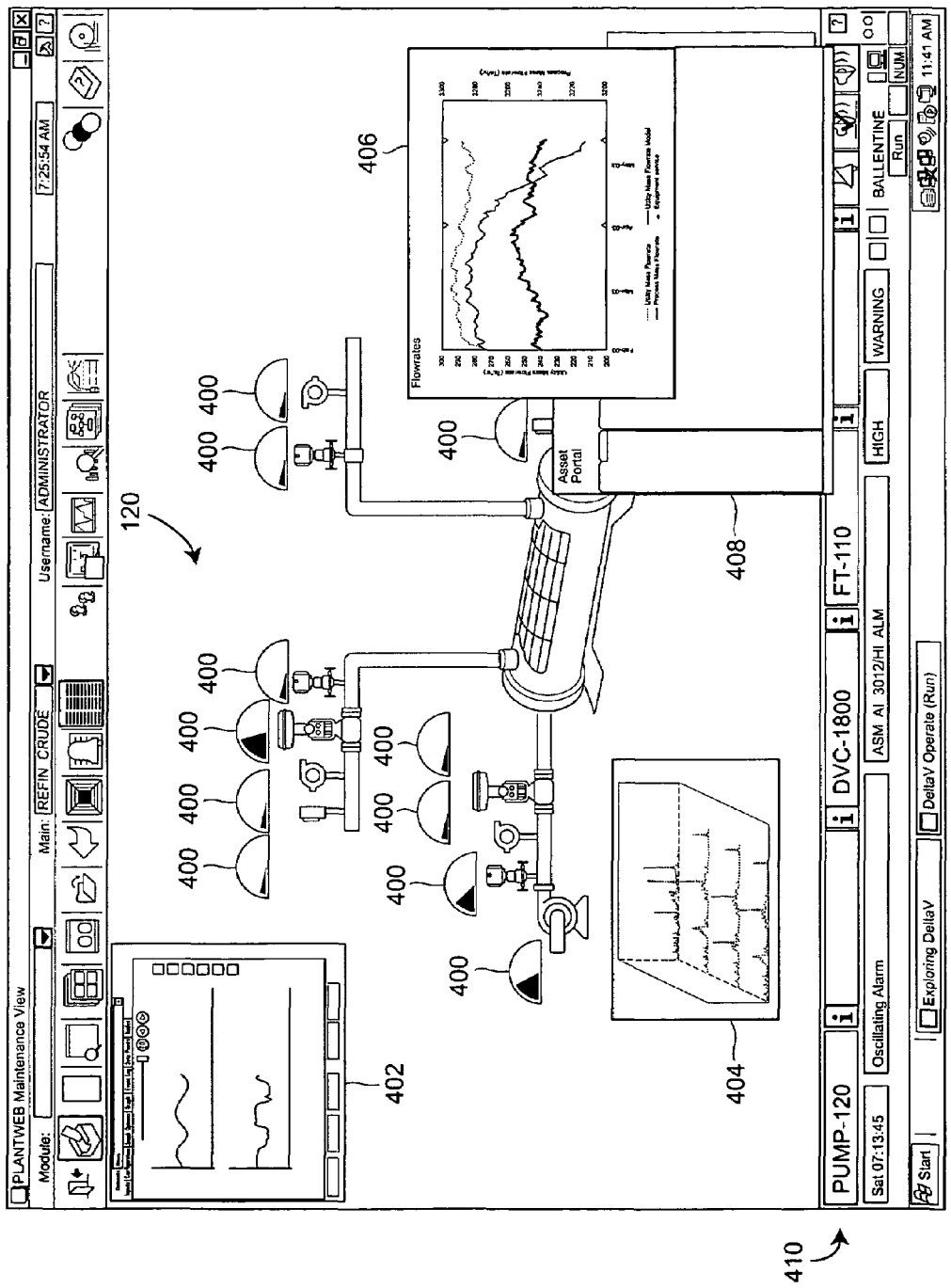
FIG. 9 illustrates a screen display of a maintenance operator's view of particular entities associated with the process plant.
Figure 10:
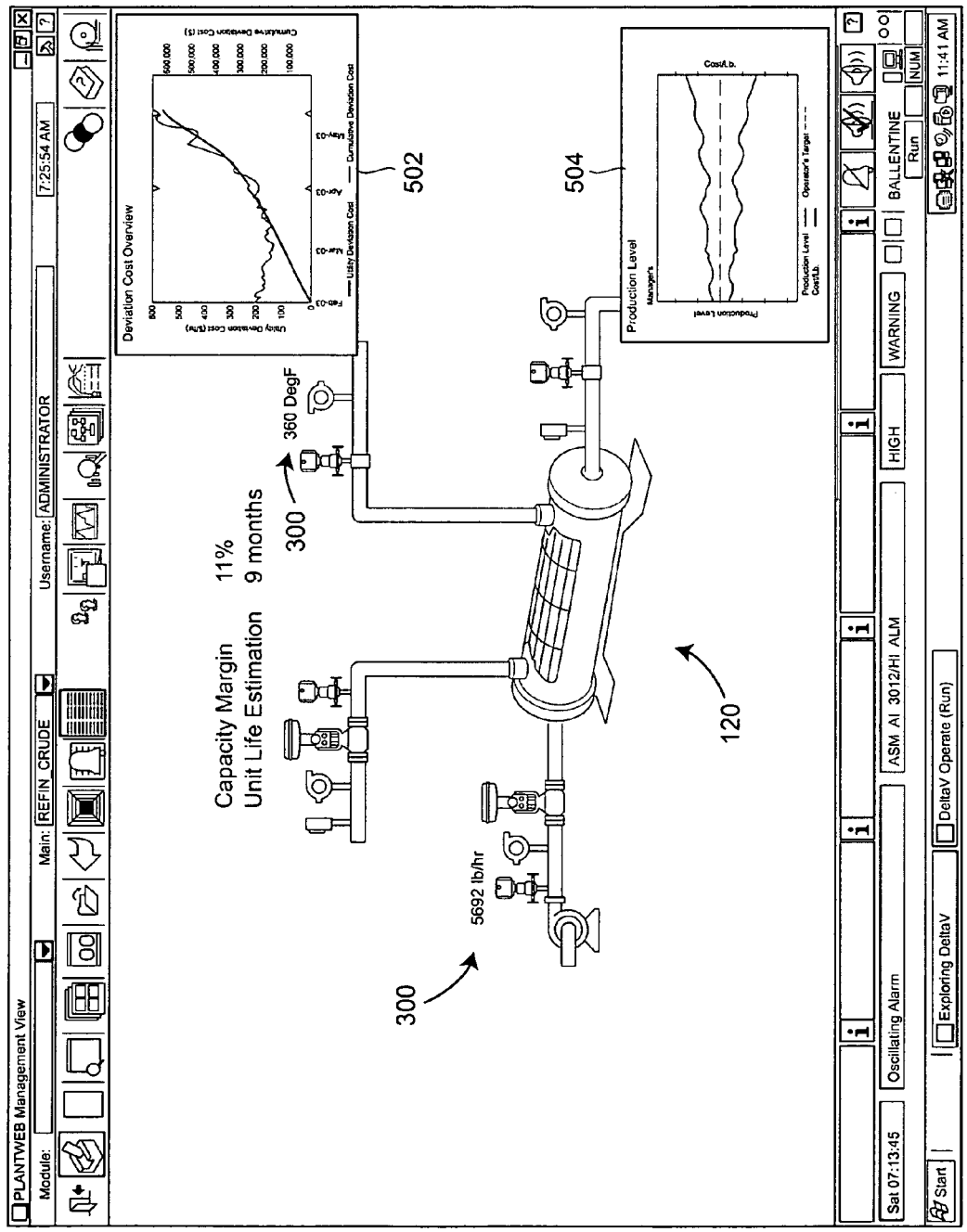
FIG. 10 illustrates a screen display of a plant manager's view of particular entities associated with the process plant.

For example, FIGS. 8-10 illustrate different views for the unit object 120 illustrated in FIGS. 4 and 5 that may be created by the user interface routines 35 using information provided by the process configuration module 39 for that unit object 120. In particular, a different graphical view may be provided for each of the process operators, maintenance persons, plant managers or supervisors, and the like to enable these different users to view a particular portion of the process plant 10 in terms relevant to their responsibilities.

FIG. 8 illustrates an example of an operator's display for the unit object 120 of FIGS. 4 and 5. Of course, it should be recognized that although a unit object 120 for the heat exchanger portion is depicted within the operator's display shown in FIG. 8, any other portion of the plant 10 such as, for example, a loop, device, area, etc. may be shown instead to achieve the same or similar results. In particular, the operator's display illustrates the basic graphic (established during the creation of the unit object 120) graphically depicting this unit as including two input flow control units (made up of valves, transmitters, etc.) and two output flow control units (made up of valves, transmitters, and other devices) connected to a heat exchanger. The operator's display of FIG. 8 may also include control-related information 300 that may be needed by the control operator to understand what is happening within the process. For example, flows, measured sensor values (such as pressures, temperatures, etc.), and other typical control information 300 may be illustrated to the operator next to the depiction of the device or area in the unit object 120 to which these values apply. These values may be online values either measured by the actual devices within the process plant 10 or developed by devices such as field devices, control routines, etc. during operation of the process plant 10 and provided to the process configuration module 39 during execution of the process configuration module 39.

In particular, the process configuration modules 39 and configuration objects that make up the process configuration modules 39 are communicatively tied to, and obtain data from the different devices with which they are associated and may display this data on the operator's view. Thus, the configuration object for a pump within the graphic of FIG. 8 may be aware that it is connected to the flow transmitter, and may receive data from the configuration object for this entity. The configuration object for the flow transmitter may obtain the readings of the flow through the actual device as measured by the device in the process plant 10. A method associated with the configuration object for the pump may receive the data from the configuration object for the flow transmitter, and determine the variability of the flow as measured by the flow transmitter and this information may be displayed on the operator's display. If desired, a method associated with the configuration object for the flow transmitter may determine the variability of that transmitter, or an application within the transmitter itself may determine the transmitter variability, and provide this determination as data to the configuration object for the transmitter.

Additionally, as illustrated in FIG. 8, the operator's display may include an alarm banner 305 illustrating one or more pending alarms that have been received for any of the devices or elements depicted in or associated with the unit object 120. The specifics of the alarm banner 305, or the application which produces it, may be specified as a control attribute for the unit object 120. Each of the alarms within the alarm banner 305 may be represented using an alphanumeric indicator that is uniquely associated with the devices or elements that generated the alarm. In the example display of FIG. 8, there is a control alarm (associated with the control loop PIC-101) and a pump alarm (associated with the PUMP-120 device) depicted in the alarm banner 305. Of course, as is normal in alarm display applications, each of the alarms within the alarm banner 305 may also include an information button 310, which may be selected by the operator to view more information relating to that particular alarm, to turn off or acknowledge the alarm, etc.

As also illustrated in FIG. 8, information from one or more relevant control applications, such as control diagnostics applications, may be provided on the operator's display. For example, a diagnostic-graphic 330 entitled DeltaV Inspect illustrates the number of control modules (associated with the control routines used in the unit object 120) that are in the incorrect mode, that are in limited control, that have uncertain input and large variability. Furthermore a diagnostic graph may indicate the number of assets being monitored (in this case 211) and of that number, how many have failed, need maintenance or some other attention soon, have an advisory condition, or are no longer communicating. It will be noted that this graphic 330 may be generated by, or the information within this graphic 330 may be obtained or generated by a control diagnostic application, which may be one of the applications 200-208 of FIG. 7. In addition, this information may be provided to the user interface routines 35 as part of the operator's display because this information may be referenced as an attribute by the appropriate process configuration module 39. Thus, the operator's display may be configured to obtain this information automatically from the appropriate applications 200-208 either separately, or because this information is referred to as a control attribute within the unit object 120.

As illustrated in FIG. 8, a production level graph 340 may also be provided on the operator's display. Again, the production level graph 340 may be generated by one of the applications 200-208 and provided automatically as part of the operator's display in the same manner as the diagnostic graph 330. It will be understood that the operator viewing the display of FIG. 8 may select any of the elements thereof to obtain more detailed information pertaining to that element. For example, the operator may select any of the physical elements depicted in the display of FIG. 8 to drill down into that element to obtain more information about that element. For example, selecting a valve on the display of FIG. 8 may call up the display for the valve enabling the operator to view detailed device status and performance information only about the valve, including alarm information for the valve, the diagnostic displays configured for the valve (which may be the same as or different than the diagnostic or other displays illustrated for the unit object 120 in which the valve is located). Similarly, the operator may select one of the graphs 330, 340 on the operator's display to pull up or obtain more information or even to access the application that generated that graph 330, 340. Additionally, the operator may select displayed information to, for example, determine the origin of that information, or to determine other data related to the displayed information.

While the operator may drill down into physical elements on the display to obtain information about those elements, the operator may also go to a higher level, such as to the area in which the unit object 120 is located to view information about that area. In this manner, the operator may obtain access to wider or narrower portions of the process plant 10 to thereby browse around or view control information about these wider or narrower portions of the process plant 10. Additionally, the operator, by drilling down into different portions of a process plant 10, may view the control information 300 related to these different portions of the process plant 10. Still further, it will be understood that, if desired, the information displayed on the operator's view may be limited or specific to the portion of the process plant 10 depicted on the view. Thus, for example, the graphs 330 and 340 and other information created by supporting applications 200-208 and placed on the operator's display may be limited to including data associated with the devices depicted on the operator's display. In this manner, the operator may select the scope of information he or she wishes to see based on the physical portion of the process plant 10 depicted in the operator's display.

Thus, as will be understood, the operator (or other user) may move or browse to different portions of the process plant 10 based on the graphical depiction of the process plant 10 on the display, and thereby view the configuration and control information 300 associated with those different portions of the process plant 10 without the need for navigational tree structures, as is currently used by most process plant applications, such as control and maintenance applications. In other words, the operator (or other user) may select the amount of data and the area of the process plant 10 for which he or she wishes to see data by browsing to the appropriate graphical depiction of that section of the plant 10, instead of by moving through a navigational tree structure.

In a manner similar to the operator's display of FIG. 8, the user interface routines 35 may create a maintenance display for maintenance persons to enable maintenance persons to view the information in which they are most interested. For example, maintenance persons, who are primarily responsible for assuring that the actual devices and equipment within the process are operating efficiently, and for repairing and replacing malfunctioning equipment are typically concerned with and view information about the operating states of the devices and equipment within the process 10.

FIG. 9 illustrates an example of a maintenance display in which a maintenance person may view device-specific information about devices and equipment within the plant 10. As will be seen, the maintenance display of FIG. 9 is associated with the unit object 120 of FIGS. 4 and 5, and includes the same graphic display of the physical elements associated with the unit object 120, as depicted in the operator's display of FIG. 8. As indicated above, this maintenance display may be created by or associated with the process configuration module 39 for the unit object 120. However, instead of control-related information 300, device maintenance information (which may be obtained by the process configuration module 39 for the unit object 120) is displayed at relevant locations of the maintenance display. For example, status or health information for devices may be displayed in the form of graphic meters or gauges 400 (i.e., the partially-shaded, semi-circular features) illustrating, for example, green (good) and red (bad). This health information may be measured or determined by the devices themselves (which is currently available with some devices sold by Emerson Process Management) or may be determined by one or more other applications, such as, for example, one of the maintenance applications 200 of FIG. 7. Health information for the unit, the area, and the plant may be a weighted aggregation of all the health information below the respected plant hierarchy. In any event, as illustrated in FIG. 9, the graphic meters or gauges 400 indicate different levels of health for the different devices within the unit object 120 to provide the maintenance operator with an easy manner of determining the status or health of the device.

As can be appreciated from the maintenance display shown in FIG. 9, a user may quickly ascertain whether an area is performing properly and will continue to perform properly. Furthermore, a maintenance person or other user may also quickly identify those devices, units, etc. that may need attention and/or which may be causing a particular problem via the maintenance display.

Additionally, maintenance graphs 402-406 illustrating the operation of the unit object 120 are illustrated in the maintenance view to help a maintenance person or other user understand the current operation of this unit from a maintenance standpoint. Of course, these graphs 402-406 may be generated by one or more maintenance applications 200 (or other applications if so desired), and may be selected by a maintenance person (or other user) to obtain more access to these applications. Thus, for example, a maintenance person may select one of the graphs 402-406 to cause the application that generated the graph to change the parameters used to create the graph. Additionally, a maintenance person or other user may view other information about a device such as, for example, the unit object 120, via an asset portal application (which has a display 408 illustrated in FIG. 9) to obtain online information provided about that device from, for example, a maintenance database.

Likewise, the maintenance display of FIG. 9 includes a maintenance alarm banner 410 that illustrates the maintenance or device alarms currently active for the devices displayed within the maintenance display. In this case, maintenance alarms are active for a pump named PUMP-120, a valve controller named DVC-1800, and a flow transmitter named FT-110. Of course, the maintenance alarm banner 410 may be produced by an alarm display application that is referred to by the process configuration module 39 for the unit object 120 as a maintenance attribute.

It will be understood that a maintenance person (or other user) may browse to other areas, units, devices, etc. of the process plant 10 via the graphic display in the same manner that a control operator (or other user) does via the operator's display of FIG. 8. Likewise, a maintenance person (or other user) may access other or additional information provided by the maintenance applications by selecting one or more of the maintenance graphs 402-406 for these applications and have these applications operate on the data or provide additional data or analysis associated with the devices currently depicted within the maintenance display.

FIG. 10 illustrates an example of a plant manager's display for the unit object 120 of FIGS. 4 and 5. While using the same graphics for the physical devices as used by the operator and the maintenance displays of FIGS. 8 and 9, respectively, the manager's display may provide other types of information about the unit object 120 relevant to a manager making decisions about what to manufacture, the current level of production versus the target level, the deviation cost information, etc. Of course, management graphs 502, 504 may be created by the business applications 208 of FIG. 7, and the information may be configured to be part of the manager's display as an attribute of the process configuration module for the unit object 120. Of course, a manager (or other user) may drill down or up in the graphic display of FIG. 10 in the same manner as described above with respect to the operator and maintenance displays of FIGS. 8 and 9, respectively, to view and obtain additional or different information via the display from the same or other applications designed to produce this information.

While the integrated configuration system is described herein using a unit object 120 as an example, it will be understood that similar displays and configuration activities may be performed and generated for any other entity or level of entity within the process plant 10, including physical devices (such as field devices), units, areas, the entire plant 10, as well as for logical entities such as control entities. Still further, it will be understood that the process configuration modules 39, which are created only once, are created in such a manner that they may be accessed by other applications 200-208 without the need to provide configuration information to those applications 200-208. Instead, all of the applications 200-208 may rely on the process configuration modules 39 for a specification of the configuration of the process plant 10. Likewise, the process configuration modules 39 include control, maintenance, business, optimizer, etc. attributes to define the manner in which different control, maintenance, business, optimizer activities are to be performed, including the manner in which this data is to be displayed on a user interface such as, for example, the display device 37 to different types of users. Still further, because the process configuration modules 39 include graphic displays depicting the devices and other entities associated therewith, including the manner in which these devices are interconnected, a user of any kind may browse to obtain information about different parts of the process plant 10 by browsing to a graphic display associated with that section of the plant 10. Thus, a user may easily understand the data the user is viewing because this data is related to the physical portion of the plant 10 currently depicted in the graphic display. To view information about a different portion of the process plant 10, the user only needs to navigate or browse to the display for that portion of the process plant 10, thus making finding information about a desired portion of the process plant 10 easier and more intuitive.

While the integrated configuration system and the other applications described herein are preferably implemented in software, they may be implemented in hardware, firmware, etc., and may be implemented by any other processor associated with the process control system. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk (such as a DVD) or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Thus, while the present disclosure has been described with reference to specific examples, which are intended to be illustrative only and not to be limiting, it will be apparent to those of ordinary skill in the art that changes, additions or deletions may be made to the disclosed embodiments without departing from the spirit and scope of the disclosure.

What is claimed is:

1. A configuration viewing system for use in a process plant having a processor and a user interface, the configuration viewing system comprising:
   a computer readable memory;
   a plurality of template configuration objects stored on the computer readable memory, wherein each of the plurality of template configuration objects includes a graphical representation of a physical entity within the process plant, a parameter storage adapted to communicate with the process plant to obtain and store device parameter information associated with the physical entity within the process plant and a configuration storage adapted to store configuration parameters associated with the physical entity within the process plant;
   a first routine stored on the computer readable memory and adapted to be executed on the processor to present a library section on the user interface, the library section adapted to present depictions of the plurality of template configuration objects to a user via the user interface;
   a second routine stored on the computer readable memory and adapted to be executed on the processor to present a configuration area on the user interface; and
   a third routine stored on the computer readable memory and adapted to be executed on the processor to enable a user to select one of the plurality of template configuration objects from the library section and to place the selected template configuration object within the configuration area to create a process configuration module within the configuration area, the process configuration module associated with a portion of the process plant,
   wherein the created process configuration module is an executable object including a particular displayable graphical representation associated with a particular physical entity within the process plant, a particularly configured parameter storage which, when executed, communicates with the particular physical entity within the process plant to obtain and store particular device parameter information associated with the particular physical entity within the process plant and a particularly configured configuration storage which stores particular configuration parameters associated with the particular physical entity within the process plant.

2. The configuration viewing system of claim 1, further including a fourth routine stored on the computer readable memory and adapted to be executed on the processor to execute the process configuration module to obtain device parameter information from the process plant pertaining to the physical entity associated with the process configuration module and to make the obtained device parameter information available to the user via the user interface.

3. The configuration viewing system of claim 2, including an application communicatively coupled to the process configuration module which uses the device parameter information and the configuration parameters associated with the process configuration module to perform a data processing function with respect to the physical entity associated with the process configuration module.

4. The configuration viewing system of claim 2, including an application communicatively coupled to the process configuration module which uses the configuration parameters associated with the process configuration module to perform a data processing function with respect to the physical entity associated with the process configuration module.

5. The configuration viewing system of claim 2, including an application communicatively coupled to the process configuration module which uses the device parameter information associated with the process configuration module to perform a data processing function with respect to the physical entity associated with the process configuration module.

6. The configuration viewing system of claim 5, wherein the application is a process control application.

7. The configuration viewing system of claim 5, wherein the application is a control diagnostic application.

8. The configuration viewing system of claim 5, wherein the application is a management application.

9. The configuration viewing system of claim 5, wherein the application is a device diagnostic application.

10. The configuration viewing system of claim 5, wherein the application is a control optimizer application.

11. The configuration viewing system of claim 2, wherein the fourth routine is adapted to display the obtained device parameter information to the user via the user interface in conjunction with the graphical representation of the physical entity.

12. The configuration viewing system of claim 2, wherein the configuration parameters include a display format for the device parameter information and wherein the fourth routine displays the device parameter information on the user interface according to the display format.

13. The configuration viewing system of claim 12, wherein the display format is one of an operator display format and a maintenance display format.

14. The configuration viewing system of claim 2, wherein the configuration parameters include multiple display formats for the device parameter information and wherein the fourth routine displays the device parameter information on the user interface according to a selected one of the multiple display formats.

15. The configuration viewing system of claim 1, wherein the third routine is adapted to enable a user to store the configuration parameters within the configuration storage of the selected template configuration object to create the process configuration module.

16. The configuration viewing system of claim 15, wherein the third routine is adapted to enable a user to store data indicative of one or more physical attributes associated with the physical entity as the configuration parameters.

17. The configuration viewing system of claim 16, wherein the one or more physical attributes includes at least one of a size, a flow capacity, a type, a volume, a surface area, a number of process input/output connections, a type of a process input/output connection, and a timing parameter.

18. The configuration viewing system of claim 15, wherein the third routine is adapted to enable a user to store data indicative of a communication attribute associated with the physical entity.

19. The configuration viewing system of claim 18, wherein the communication attribute includes at least one of a communication protocol, a communication connection type, a number of communication inputs/outputs, and a type of communication connection input/output.

20. The configuration viewing system of claim 15, wherein the third routine is adapted to enable a user to store control information associated with control of the physical entity within the process plant.

21. The configuration viewing system of claim 20, wherein the control information includes a control routine.

22. The configuration viewing system of claim 20, wherein the control information includes an indication of a type of a control routine used to control the physical entity.

23. The configuration viewing system of claim 20, wherein the control information includes a control diagnostic used to perform diagnostics with respect to controlling the physical entity.

24. The configuration viewing system of claim 20, wherein the control information includes values for one or more control parameters associated with control of the physical entity.

25. The configuration viewing system of claim 24, wherein the one or more control parameters includes at least one of a setpoint, an initial value, a default value, a range, a measurement unit, a limit, and a deadband.

26. The configuration viewing system of claim 1, wherein at least one of the plurality of template configuration objects includes a simulation algorithm adapted to simulate operation of an entity within the process plant.

27. The configuration viewing system of claim 1, wherein the configuration storage is adapted to store maintenance information associated with operation of the physical entity.

28. The configuration viewing system of claim 27, wherein the maintenance information includes alarm configuration information.

29. The configuration viewing system of claim 27, wherein the maintenance information includes device health configuration information.

30. The configuration viewing system of claim 27, wherein the maintenance information includes maintenance diagnostics information.

31. The configuration viewing system of claim 1, wherein the configuration storage is adapted to store process management information associated with managing the process in which the physical entity is located.

32. The configuration viewing system of claim 31, wherein the process management information includes data related to at least one of a product type, a throughput, an efficiency, an uptime, a downtime, and a yield.

33. The configuration viewing system of claim 1, wherein the plurality of template configuration objects includes one of a device object representative of a device within the process plant, a unit object representative of a unit within the process plant, an area object representative of an area of the process plant and a connection object representative of a connector element within the process plant.

34. The configuration viewing system of claim 1, wherein the configuration parameters include an indication of one or more applications adapted to use the device parameter information to produce process information related to the physical entity and further including a fourth routine adapted to present the process information on the user interface.

35. The configuration viewing system of claim 34, wherein the one or more applications includes a control diagnostics application.

36. The configuration viewing system of claim 34, wherein the one or more applications includes a device diagnostics application.

37. The configuration viewing system of claim 34, wherein the one or more applications includes a process management application.

38. The configuration viewing system of claim 34, wherein the one or more applications includes an alarm application.

39. The configuration viewing system of claim 1, wherein the third routine is adapted to enable the user to create a plurality of interconnected process configuration modules in the configuration area, wherein each process configuration modules is associated with a different portion of the process plant, and further including a fourth routine adapted to execute the plurality of interconnected process configuration modules, including a first display routine adapted to display the graphic representations for a user-specified sub-portion of the plurality of interconnected process configuration modules on a user interface and a second display routine adapted to display process information associated with the process plant based on the user-specified sub-portion of the plurality of interconnected process configuration modules.

40. The configuration viewing system of claim 39, wherein the second display routine displays the process information in a manner determined by the configuration parameters stored in the configuration storage of at least one of the process configuration modules within the user-specified sub-portion of the plurality of interconnected process configuration modules.

41. The configuration viewing system of claim 40, furthering including an application that uses the process information of one or more of the process configuration modules within the user-specified sub-portion of the plurality of interconnected process configuration modules to produce the process information.

42. The configuration viewing system of claim 1, wherein the third routine is adapted to enable the user to interconnect two or more of the template configuration objects within the configuration area to create the process configuration module.

43. The configuration viewing system of claim 42, wherein the third routine is adapted to enable the user to interconnect the two or more of the template configuration objects to create a device process configuration module representative of a field device within the process plant.

44. The configuration viewing system of claim 42, wherein the third routine is adapted to enable the user to interconnect the two or more of the template configuration objects to create a unit process configuration module representative of a unit within the process plant.

45. The configuration viewing system of claim 42, wherein the third routine is adapted to enable the user to interconnect the two or more of the template configuration objects to create an area process configuration module representative of an area within the process plant.

46. A configuration entity adapted to be executed on a processor to present information with respect to a process element to a user on a user interface during operation of a process, the configuration entity comprising:
　a computer readable memory; and
　a configuration object stored on the computer readable memory and adapted to be executed on the processor, the configuration object including;
　　a display graphic representing the process element within the process and adapted to be displayed on the user interface during operation of the process;
　　a communication interface adapted to communicate with the process to receive parameter information pertaining to the process element during operation of the process;

a parameter storage adapted to store the parameter information; and a configuration attribute storage adapted to store configuration information pertaining to the process element within the process;

wherein the configuration object is an executable object including a particular display graphic associated with a particular process element, a particularly configured communication interface adapted to communicate with the process plant to obtain and store particular parameter information associated with the particular process element within the process plant and a particularly configured configuration attribute storage that stores particular configuration parameters associated with the particular process element within the process plant.

47. The configuration entity of claim 46, wherein the configuration object further includes a connection element specifying a connection to a further configuration object.

48. The configuration entity of claim 46, wherein the configuration attribute storage is adapted to store data indicative of one or more physical attributes associated with the process element.

49. The configuration entity of claim 48, wherein the one or more physical attributes includes at least one of a size, a flow capacity, a type, a volume, a surface area, a number of process input/output connections, a type of a process input/output connection, and a timing parameter.

50. The configuration entity of claim 46, wherein the configuration attribute storage is adapted to store a communication attribute associated with the process element.

51. The configuration entity of claim 50, wherein the communication attribute includes at least one of a communication protocol, a communication connection type, a number of communication inputs/outputs, and a type of communication connection input/output.

52. The configuration entity of claim 46, wherein the configuration attribute storage is adapted to store control information associated with control of the process element within the process.

53. The configuration entity of claim 52, wherein the control information includes a control routine.

54. The configuration entity of claim 52, wherein the control information includes an indication of a type of a control routine used to control the process element.

55. The configuration entity of claim 52, wherein the control information includes a control diagnostic used to perform diagnostics with respect to control of the process element.

56. The configuration entity of claim 52, wherein the control information includes values for one or more control parameters associated with control of the process element.

57. The configuration entity of claim 56, wherein the one or more control parameters includes at least one of a setpoint, an initial value, a default value, a range, a measurement unit, a limit, and a deadband.

58. The configuration entity of claim 46, wherein the configuration object further includes a simulation algorithm adapted to simulate operation of the process element.

59. The configuration entity of claim 46, wherein the configuration attribute storage is adapted to store maintenance information associated with operation of the process element.

60. The configuration entity of claim 59, wherein the maintenance information includes alarm information.

61. The configuration entity of claim 59, wherein the maintenance information includes device health information.

62. The configuration entity of claim 59, wherein the maintenance information includes device calibration information.

63. The configuration entity of claim 59, wherein the maintenance information includes maintenance diagnostics information.

64. The configuration entity of claim 46, wherein the configuration attribute storage is adapted to store process management information associated with managing the process in which the process element is located.

65. The configuration entity of claim 64, wherein the process management information includes data related to a product type.

66. The configuration entity of claim 64, wherein the process management information includes data related to a throughput.

67. The configuration entity of claim 64, wherein the process management information includes data related to an efficiency.

68. The configuration entity of claim 64, wherein the process management information includes data related to an uptime or a downtime.

69. The configuration entity of claim 64, wherein the process management information includes data related to a yield.

70. The configuration entity of claim 46, further including a display routine adapted to display on the user interface the parameter information related to the process element in a manner determined by the configuration information.

71. The configuration entity of claim 46, wherein the configuration attribute storage is adapted to store a reference to a further application that is configured to process the parameter information to produce additional process information.

72. The configuration entity of claim 71, wherein the further application is a process optimizer application.

73. The configuration entity of claim 71, wherein the further application is an equipment monitoring application.

74. The configuration entity of claim 71, wherein the further application is a process control application.

75. The configuration entity of claim 71, wherein the further application is a process management application.

76. The configuration entity of claim 71, further including a display routine adapted to display the additional process information on the user interface in conjunction with the display graphic.

77. The configuration entity of claim 76, wherein the further application is a process control application.

78. The configuration entity of claim 76, wherein the further application is an equipment monitoring application.

79. The configuration entity of claim 76, wherein the further application is an equipment maintenance application.

80. The configuration entity of claim 76, wherein the further application is a process management application.

81. The configuration entity of claim 76, wherein the further application is a diagnostic application.

82. The configuration entity of claim 46, further including a display routine adapted to display the parameter information on the user interface in conjunction with the display graphic.

83. The configuration entity of claim 82, wherein the display routine is adapted to display the parameter information in the form of a graph.

84. The configuration entity of claim 82, wherein the display routine is adapted to display the parameter information in the form of text.

85. An integrated configuration system for use in a process plant, the integrated configuration system comprising:

one or more workstations each having a processor, a memory, and a display device;

a configuration application stored in the memory and adapted to be executed on one of the processors to create a process configuration module using one or more configuration objects, wherein the process configuration module is communicatively coupled to an entity associated with the process plant, and wherein each of the configuration objects includes a graphical representation of a physical entity within the process plant, a parameter storage adapted to store device parameter information associated with the physical entity within the process plant and a configuration storage adapted to store configuration parameters associated with the physical entity within the process plant;

a plurality of data source applications stored in the memory and adapted to be executed on one of the processors to collect or generate application data pertaining to the associated process entity; and a user interface application stored in the memory and adapted to be executed on the processor to display a graphical view via the display device using the process configuration module and the application data;

wherein the process configuration module is an executable object including a particular graphical representation associated with a particular physical entity, a particularly configured parameter storage adapted to communicate with the process plant to obtain and store particular device parameter information associated with the particular physical entity within the process plant and a particularly configured configuration storage that stores particular configuration parameters associated with the particular physical entity within the process plant.

86. The integrated configuration system of claim 85, wherein the process configuration module includes an attribute that defines an operating characteristic associated with the process configuration module.

87. The integrated configuration system of claim 86, wherein the attribute includes an identification of one or more of the plurality of the data source applications communicatively coupled to the process configuration module.

88. The integrated configuration system of claim 86, wherein the attribute includes at least one of an engineering attribute, a control attribute, a maintenance attribute, and a management attribute.

89. The integrated configuration system of claim 85, wherein the graphical view includes at least one of an engineering view, an operator view, a maintenance view, and a management view.

90. The integrated configuration system of claim 85, wherein the associated process entity includes one of a process area, a process unit, power equipment, rotating equipment, a field device, a connection device, and a control loop.

91. The integrated configuration system of claim 85, wherein each of the configuration objects further includes a tag to perform communications.

92. The integrated configuration system of claim 85, wherein each of the configuration objects further includes one or more inputs and outputs and a method adapted to perform a function related to process operation using the device parameter information.

93. The integrated configuration system of claim 92, wherein the device parameter information includes at least one of parameter data, status data, input data, output data, and cost data.

94. The integrated configuration system of claim 85, further including an object library stored on the memory, wherein the object library is adapted to store a plurality of predefined configuration objects that may be accessed by the configuration application to create the process configuration module.

95. The integrated configuration system of claim 94, wherein the plurality of predefined configuration objects includes at least one of an area object, a unit object, a device object, a connection object, and a control loop object.

96. The integrated configuration system of claim 94, wherein the configuration application is adapted to enable a user to create at least one custom configuration object using the plurality of predefined configuration objects, and to store the at least one custom configuration object in the object library.

97. The integrated configuration system of claim 85, further including an execution engine stored in the memory and adapted to be executed on the processor that executes the process configuration module during operation of the process plant to perform a function related to process operation.

98. The integrated configuration system of claim 85, wherein the plurality of data source applications includes at least one of a maintenance system application, an optimizer application, a predictive control application, an equipment monitoring application, and a business application.

99. The integrated configuration system of claim 85, wherein the configuration application is located remotely from the plurality of data source applications, and is adapted to communicate with the plurality of data source applications via a communication link.

100. The integrated configuration system of claim 99, wherein the communication link comprises the Internet.

101. An integrated configuration system for modeling a layout of a process plant, the integrated configuration system comprising:

a computer readable memory;

a configuration routine stored on the computer readable memory and adapted to be executed on a processor, wherein the configuration routine creates a process configuration module for an entity associated with the process plant using one or more configuration objects, wherein each configuration object is an executable object including a particular graphical representation associated with a particular sub-entity associated with the entity, a particularly configured parameter storage adapted to communicate with the process plant to obtain and store particular device parameter information associated with the particular sub-entity associated with the entity and a particularly configured configuration storage that stores particular configuration parameters associated with the particular sub-entity associated with the entity, and wherein the process configuration module is communicatively coupled to the entity associated with the process plant;

an application routine stored on the computer readable memory and adapted to be executed on the processor, wherein the application routine collects or generates application data pertaining to the entity associated with the process plant; and a user interface routine stored on the computer readable memory and adapted to be executed on the processor, wherein the user interface routine generates a graphical view of the process plant via a display device based on the process configuration module and the application data.

102. The integrated configuration system of claim 101, wherein the configuration routine enables a user to specify an attribute associated with the process configuration module.

103. The integrated configuration system of claim 102, wherein the attribute includes an identification of one or more data source applications communicatively coupled to the process configuration module to access data associated with the process configuration module.

104. The integrated configuration system of claim 102, wherein the attribute includes at least one of an engineering attribute, a control attribute, a maintenance attribute, and a management attribute.

105. The integrated configuration system of claim 101, wherein the graphical view includes at least one of an engineering view, an operating view, a maintenance view, and a management view.

106. The integrated configuration system of claim 101, wherein each of the configuration objects includes a data storage adapted to store object data pertaining to the associated process sub-entity, a graphic representation depicting the associated process sub-entity, one or more inputs and outputs, and a method adapted to perform a function related to process operation using the application data.

107. A method for integrating the viewing and configuration activities of multiple applications within a process plant, the method comprising:
creating a process configuration module by interconnecting one or more configuration objects, wherein each of the configuration objects is an executable object including a particular graphical representation associated with a particular physical entity within the process plant, a particular parameter storage adapted to communicate with the process plant to obtain and store particular device parameter information associated with the particular physical entity within the process plant and a particular configuration storage adapted to store particular configuration parameters associated with the particular physical entity within the process plant, wherein the process configuration module is communicatively coupled to an entity associated with the process plant that includes each of the particular physical entities associated with each of the one or more configuration objects;
collecting or generating application data pertaining to the associated process entity; and
generating a graphical view based on the process configuration module and the application data.

108. The method of claim 107, further including specifying an attribute associated with the process configuration module.

109. The method of claim 108, wherein specifying the attribute associated with the process configuration module includes identifying one or more data source applications that are communicatively coupled to the process configuration module to access the application data associated with the process configuration module.

110. The method of claim 108, wherein specifying the attribute associated with the process configuration module includes specifying at least one of an engineering attribute, a control attribute, a maintenance attribute, and a management attribute.

111. The method of claim 107, further including storing a plurality of predefined configuration objects in an object library.

112. The method of claim 111, further including creating at least one custom configuration object using the plurality of predefined configuration objects, and storing the at least one custom configuration object in the object library.

113. The method of claim 111, wherein creating the process configuration module includes providing a configuration section on a display device, selecting a depiction of one of the plurality of predefined configuration objects from the object library, dragging the selected depiction of one of the plurality of predefined configuration objects to the configuration section and dropping the selected depiction of one of the plurality of predefined configuration objects in a desired location on the configuration section.

114. The method of claim 107, further including executing the process configuration module to perform a function related to process operation.

115. A method of configuring and viewing the operation of a process, comprising:
storing a set of template configuration objects in a computer readable memory wherein each of the template configuration objects includes a display graphic representing one or more physical elements within the process;
enabling a user to create a process configuration module from one or more of the stored template configuration objects, wherein the created process configuration module is associated with a particular entity within the process, and is an executable object including a particular graphical representation associated with a particular entity, a particular parameter storage adapted to communicate with devices within the process to obtain and store device parameter information associated with the particular entity within the process and a particular configuration storage adapted to store configuration parameter information associated with the particular entity within the process;
enabling the user to provide configuration parameter information for the process configuration module indicative of a configuration of the particular entity within the process;
executing the process configuration module during operation of the process to communicate with the process to receive device parameter information pertaining to the particular entity within the process;
storing the received device parameter information and the configuration parameter information; and
displaying the display graphic representing one or more physical elements associated with the process configuration module to the user via a user interface.

116. The method of configuring and viewing the operation of a process of claim 115, wherein executing the process configuration module includes displaying the configuration parameter information or the device parameter information to the user via the user interface in conjunction with at least one display graphic representing at least one of the physical elements.

117. The method of configuring and viewing the operation of a process of claim 115, wherein enabling the user to provide configuration parameter information for the process configuration module includes enabling the user to specify one or more engineering parameters associated with the process configuration module.

118. The method of configuring and viewing the operation of a process of claim 117, wherein enabling the user to specify one or more engineering parameters associated with the process configuration module includes enabling the user to specify at least one of a size, a flow capacity, a type, a volume, a surface area, a number of process input/output connections, a type of a process input/output connection, and a timing parameter.

119. The method of configuring and viewing the operation of a process of claim 115, wherein enabling the user to provide configuration parameter information for the process configuration module includes enabling the user to specify one or more control parameters associated with control of the particular entity with which the process configuration module is associated.

120. The method of configuring and viewing the operation of a process of claim 119, wherein enabling the user to specify one or more control parameters includes enabling the user to specify a specific control routine used within a controller of the process.

121. The method of configuring and viewing the operation of a process of claim 119, wherein enabling the user to specify one or more control parameters includes enabling the user to specify a type of a control routine used to control the particular entity with which the process configuration module is associated.

122. The method of configuring and viewing the operation of a process of claim 119, wherein enabling the user to specify one or more control parameters includes enabling the user to specify a control diagnostic used to perform diagnostics with respect to the control of the particular entity with which the process configuration module is associated.

123. The method of configuring and viewing the operation of a process of claim 119, wherein enabling the user to specify one or more control parameters includes enabling the user to specify one or more control parameter values associated with the control of the particular entity with which the process configuration module is associated.

124. The method of configuring and viewing the operation of a process of claim 123, wherein enabling the user to specify one or more control parameter values includes enabling the user to specify a particular value for at least one of a setpoint, an initial value, a default value, a range, a measurement unit, a limit, and a deadband.

125. The method of configuring and viewing the operation of a process of claim 115, wherein enabling the user to provide configuration parameter information for the process configuration module includes enabling the user to specify one or more communication attributes associated with the particular entity with which the process configuration module is associated.

126. The method of configuring and viewing the operation of a process of claim 125, wherein enabling the user to specify one or more communication attributes includes enabling the user to specify at least one of a communication protocol, a communication connection type, a number of communication inputs/outputs, and a type of communication connection input/output.

127. The method of configuring and viewing the operation of a process of claim 115, wherein enabling the user to provide configuration parameter information for the process configuration module includes enabling the user to specify a simulation algorithm adapted to simulate operation of the particular entity with which the process configuration module is associated.

128. The method of configuring and viewing the operation of a process of claim 115, wherein enabling the user to provide configuration parameter information for the process configuration module includes enabling the user to specify one or more maintenance attributes associated with the particular entity with which the process configuration module is associated.

129. The method of configuring and viewing the operation of a process of claim 128, wherein enabling the user to specify one or more maintenance attributes includes enabling the user to specify alarming information.

130. The method of configuring and viewing the operation of a process of claim 128, wherein enabling the user to specify one or more maintenance attributes includes enabling the user to specify device health information.

131. The method of configuring and viewing the operation of a process of claim 128, wherein enabling the user to specify one or more maintenance attributes includes enabling the user to specify maintenance diagnostics information.

132. The method of configuring and viewing the operation of a process of claim 115, wherein enabling the user to provide configuration parameter information for the process configuration module includes enabling the user to specify management information associated with managing the process in which the particular entity is located.

133. The method of configuring and viewing the operation of a process of claim 132, wherein enabling the user to specify management information includes enabling the user to specify at least one of a product type, a throughput, an efficiency, an uptime, a downtime and a yield.

134. The method of configuring and viewing the operation of a process of claim 115, wherein enabling a user to create a process configuration module from one or more of the stored template configuration objects includes presenting the one or more template configuration objects to the user via the user interface, enabling the user to select the one or more template configuration objects and enabling the user to interconnect the selected one or more template configuration objects to create the process configuration module.

135. The method of configuring and viewing the operation of a process of claim 134, wherein enabling the user to create the process configuration module includes enabling the user to specify particular process entities associated with each of the one or more template configuration objects.

136. The method of configuring and viewing the operation of a process of claim 135, wherein enabling the user to specify particular process entities includes enabling the user to specify a tag associated with each of the particular process entities to be stored in the process configuration module to identify the particular process entities associated with the process configuration module.

137. The method of configuring and viewing the operation of a process of claim 115, wherein enabling the user to provide configuration parameter information for the process configuration module includes enabling the user to specify a further application to be executed using the configuration parameter information to produce additional process information and wherein executing the process configuration module during the operation of the process includes communicating the configuration parameter information to the further application.

138. The method of configuring and viewing the operation of a process of claim 137, wherein the further application is an optimizer application.

139. The method of configuring and viewing the operation of a process of claim 137, wherein the further application is a control application.

140. The method of configuring and viewing the operation of a process of claim 137, further including displaying the additional process information on the user interface in conjunction with the display graphic representing one or more physical elements associated with the process configuration module.

141. The method of configuring and viewing the operation of a process of claim 137, wherein the further application is a control diagnostics application.

142. The method of configuring and viewing the operation of a process of claim 115, wherein enabling the user to create the process configuration module from one or more of the stored template configuration objects includes enabling the user to create a plurality of process configuration modules from the one or more of the stored template configuration objects, wherein each of the plurality of process configuration modules is associated with a different portion of the process plant, and further including enabling the user to view different ones of the plurality of process configuration modules on the user interface at different times during execution of the plurality of process configuration modules.

143. The method of configuring and viewing the operation of the process of claim 142, wherein enabling the user to view different ones of the plurality of process configuration modules on the user interface at different times includes enabling the user to select a subset of the plurality of process configuration modules to view on the user interface at the same time.

144. The method of configuring and viewing the operation of the process of claim 143, further including displaying information pertaining to the process on the user interface in conjunction with the subset of the plurality of process configuration modules being displayed on the user interface.

145. The method of configuring and viewing the operation of the process of claim 144, wherein displaying information pertaining to the process on the user interface in conjunction with the subset of the plurality of process configuration modules being displayed on the user interface includes displaying information pertaining to the subset of the plurality of process configuration modules on the user interface.

146. The method of configuring and viewing the operation of the process of claim 144, wherein displaying information pertaining to the process on the user interface in conjunction with the subset of the plurality of process configuration modules being displayed on the user interface includes filtering the information to be displayed on the user interface based on the subset of the plurality of process configuration modules being displayed on the user interface.

147. The method of configuring and viewing the operation of the process of claim 146, wherein displaying information pertaining to the process includes displaying alarm information pertaining to the subset of the plurality of process configuration modules being displayed on the user interface.

148. The method of configuring and viewing the operation of the process of claim 146, wherein displaying information pertaining to the process includes displaying device maintenance information pertaining to the subset of the plurality of process configuration modules being displayed on the user interface.

149. The method of configuring and viewing the operation of the process of claim 146, wherein displaying information pertaining to the process includes displaying control information pertaining to the subset of the plurality of process configuration modules being displayed on the user interface.

150. The method of configuring and viewing the operation of the process of claim 146, wherein displaying information pertaining to the process includes displaying business information pertaining to the subset of the plurality of process configuration modules being displayed on the user interface.

151. The method of configuring and viewing the operation of the process of claim 146, further including configuring an additional application to communicate with the process configuration module to obtain information from the process configuration module.

152. The method of configuring and viewing the operation of the process of claim 151, wherein configuring the additional application to communicate with the process configuration module includes configuring the additional application to obtain engineering information from the process configuration module.

153. The method of configuring and viewing the operation of the process of claim 151, wherein configuring the additional application to communicate with the process configuration module includes configuring the additional application to obtain process control information from the process configuration module.

154. The method of configuring and viewing the operation of the process of claim 151, wherein configuring the additional application to communicate with the process configuration module includes configuring the additional application to obtain the device parameter information or the configuration parameter information sent to the process configuration module by the process.

155. The method of configuring and viewing the operation of the process of claim 151, wherein configuring the additional application to communicate with the process configuration module includes configuring the additional application to obtain the configuration parameter information from the process configuration module.

156. The configuration viewing system of claim 1, wherein the created process configuration module is adapted to provide, to a plurality of applications, the particular displayable graphical representation or the particular device parameter information or the particular configuration parameters.

157. The configuration entity of claim 46, wherein the created process configuration module is adapted to provide, to a plurality of applications, the particular display graphic or the particular parameter information or the particular configuration parameters.

158. The integrated configuration system of claim 85, wherein the created process configuration module is adapted to provide, to a plurality of applications, the particular graphical representation or the particular device parameter information or the particular configuration parameters.

159. The integrated configuration system of claim 101, wherein the created process configuration module is adapted to provide, to a plurality of applications, the particular graphical representation or the particular device parameter information or the particular configuration parameters.

160. The method of claim 107, wherein the created process configuration module is adapted to provide, to a plurality of applications, the particular graphical representation or the particular device parameter information or the particular configuration parameters.

161. The method of configuring and viewing the operation of a process of claim 115, wherein the created process configuration module is adapted to provide, to a plurality of applications, the particular graphical representation or the particular device parameter information or the particular configuration parameters.

* * * * *